United States Patent
Kim et al.

(10) Patent No.: US 9,947,066 B2
(45) Date of Patent: Apr. 17, 2018

(54) METHOD, APPARATUS AND SYSTEM FOR INSERTING WATERMARK DATA

(71) Applicant: Samsung Electronics Co., Ltd., Suwon-si, Gyeonggi-do (KR)

(72) Inventors: Hyun-wook Kim, Suwon-si (KR); Han-gil Moon, Seoul (KR); Soon-ho Baek, Seoul (KR); Jong-hwa Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 15/207,945

(22) Filed: Jul. 12, 2016

(65) Prior Publication Data

US 2017/0061562 A1 Mar. 2, 2017

(30) Foreign Application Priority Data

Aug. 25, 2015 (KR) .................. 10-2015-0119822

(51) Int. Cl.
*G06T 1/00* (2006.01)
(52) U.S. Cl.
CPC ...... *G06T 1/005* (2013.01); *G06T 2201/0065* (2013.01)
(58) Field of Classification Search
None
See application file for complete search history.

(56) References Cited

U.S. PATENT DOCUMENTS

| | | | |
|---|---|---|---|
| 6,584,210 B1 | 6/2003 | Taguchi et al. | |
| 7,058,201 B2 | 6/2006 | Mayboroda et al. | |
| 7,123,718 B1 * | 10/2006 | Moskowitz | G06T 1/005 380/205 |
| 7,266,216 B2 | 9/2007 | Braudaway et al. | |
| 2003/0198363 A1 | 10/2003 | Liao et al. | |
| 2007/0064940 A1 | 3/2007 | Moskowitz et al. | |
| 2011/0007936 A1 | 1/2011 | Rhoads | |
| 2011/0228972 A1 | 9/2011 | Nakamura et al. | |
| 2014/0294229 A1 | 10/2014 | Le Guelvouit et al. | |
| 2015/0071485 A1 | 3/2015 | Rhoads et al. | |

FOREIGN PATENT DOCUMENTS

| | | | | |
|---|---|---|---|---|
| CN | 101571945 A | * | 11/2009 | ............... G06T 1/00 |
| KR | 10-2008-0019438 A | | 3/2008 | |
| WO | 2009/005494 A1 | | 1/2009 | |

* cited by examiner

*Primary Examiner* — Bernard Krasnic
(74) *Attorney, Agent, or Firm* — Jefferson IP Law, LLP

(57) ABSTRACT

An apparatus and method for a sensor network, machine-to-machine (M2M) communication, machine type communication (MTC), and Internet of things (IoT) are disclosed. The disclosure may be applied to, for example, intelligent services related to the above technologies, in conjunction with smart homes, smart buildings, smart cities, smart cars or connected cars, health care, digital education, retail business, security, and safety related services. The method includes generating first image data by resizing original image data to a predetermined size, inserting watermark data into the first image data, and adding difference data corresponding to the difference between the original image data and the first image data to second image data that is image data in which the watermark data is inserted.

15 Claims, 23 Drawing Sheets

METHOD, APPARATUS AND SYSTEM FOR INSERTING WATERMARK DATA

CROSS-REFERENCE TO RELATED APPLICATION(S)

This application claims the benefit under 35 U.S.C. § 119(a) of a Korean patent application filed on Aug. 25, 2015 in the Korean Intellectual Property Office and assigned Serial number 10-2015-0119822, the entire disclosure of which is hereby incorporated by reference.

TECHNICAL FIELD

The present disclosure relates to methods, apparatuses, and systems for inserting digital watermark data.

BACKGROUND

The Internet has been developing from a network of human beings who generate and consume information, to an Internet of Things (IoT) network in which separate elements such as objects exchange and process information. Also, Internet of Everything (IoE) technology, in which big data processing technology through a connection to a cloud server, etc. is combined with the IoT technology, is being increasing developed. In order to implement the IoT, technological elements such as a sensing technology, a wired/wireless communication and network infrastructure, a service interface technology, and a security technology have been necessary, and recently, research into technologies such as a sensor network, machine-to-machine (M2M), and machine type communication (MTC) has been conducted.

In an IoT environment, an intelligent Internet technology (IT) service that collects and analyses data generated by objects that are connected to one another for additional benefit to human life may be provided. The IoT technology may be applied in various fields such as a smart home, smart buildings, smart cities, smart cars or connected cars, smart grids, health care, smart home appliances, and high-tech medical services, through fusing and mixing between existing IT technology and various industrial fields.

As the IoT technology has developed, producing of digital content such as multimedia has explosively increased, and accordingly, problems such as infringement of copyrights due to illegal duplication and distribution of digital content have recently become big issues. As a representative way of protecting copyrights of digital content, a watermark may be inserted into digital content. The watermark is a technology for protecting the copyrights, owing to its features such as non-visibility, robustness, clarity, and security.

FIGS. 1A and 1B illustrate a method of inserting and extracting a watermark according to the related art.

FIG. 1A illustrates a method of inserting a watermark according to the related art. Referring to FIG. 1A, a device acquires original image data in operation 10. The device resizes the original image data to a predetermined size determined by the device in operation 11. The device inserts watermark data into image data that has been resized to a predetermined size (that is, image data obtained by resizing the original image data in operation 11) in operation 12, and the device resizes an image in which the watermark data is inserted and distributes the image in operation 13.

FIG. 1B illustrates a method of extracting a watermark according to the related art. Referring to FIG. 1B, the device acquires an image in which watermark data has been inserted in operation 20. In operation 21, the device resizes the acquired image to a predetermined size. In operation 22, the device extracts the watermark data.

Referring to FIGS. 1A and 1B, since an image has to be resized in order to insert or extract watermark data in the related art, image quality degrades. Also, in the related art, when the device resizes the image in which the watermark data is inserted again and distributes the image, the watermark data inserted in the image may become lost.

Therefore, a method of inserting watermark data, which is robust and resilient against variations in data size and signal processing, is necessary.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods of inserting and extracting a watermark, capable of clearly detecting watermark data and losing less data.

In accordance with an aspect of the present disclosure, a method of inserting a watermark is provided. The method includes generating first image data by resizing original image data to a predetermined size, inserting watermark data in the first image data, and adding difference data corresponding to a difference between the original image data and the first image data to second image data that is image data in which the watermark data is inserted.

The watermark data may include effective watermark data and control watermark data.

The inserting of the watermark data may include determining at least one of an insertion location of the effective watermark data and an insertion location of the control watermark data, and inserting the effective watermark data and the control watermark data in the first image data based on a result of the determining.

The determining of the insertion location may include analyzing the first image data based on a pixel value of a predetermined pixel or predetermined pixel groups in the first image data and critical detection values, and determining the insertion location of the effective watermark data and the insertion location of the control watermark data in the first image data, based on a result of the analyzing.

The analyzing of the first image data may include comparing all or some of first image frequency signals that are converted based on the pixel value of the predetermined pixel or predetermined pixel groups in the first image data, with the critical detection values.

The determining of the insertion location of the effective watermark data and the insertion location of the control watermark data may include determining a first insertion location that is a location of a pixel or a pixel group that is determined to detect all or some of the watermark data and a second insertion location that is a location of a pixel or a pixel group that is determined to have a value that is greater or smaller than the critical detection value by a predetermined value or greater, based on a result of the comparing.

The inserting of the watermark data may include inserting the control watermark data into the first insertion location and inserting the effective watermark data into the second insertion location.

The inserting of the watermark data may include converting the effective watermark data and the control watermark data into frequency signals, and inserting the frequency signals into all or some of the first image frequency signals that are converted based on the pixel value of the predetermined pixel or predetermined pixel groups in the first image data.

The adding of the difference data may include resizing the second image data to a same size as the original image data, and adding the difference data corresponding to the difference between the original image data and the first image data to the resized second image data.

The effective watermark data may be generated based on a user input or information about the original image data.

In accordance with another aspect of the present disclosure, a method of detecting watermark data is provided. The method includes receiving first data in which predetermined data is inserted as watermark data, resizing the first data to a predetermined size, detecting the watermark data from the resized first data, and controlling to classify the first data or to perform a predetermined operation based on the watermark data.

The watermark data may include image information, and the first data is image data obtained by changing a size of original image data.

The first data may be generated by a server.

The first data may include audio data, and the watermark data may be generated based on a user input.

The watermark data may be generated as a block form or a packet form including at least one of a sync field representing a start of the watermark data, a length field representing a length of the watermark data, and a cyclic redundancy check (CRC) field, Reed-Solomon (RS) field, and a payload field for detecting and correcting errors.

In accordance with another aspect of the present disclosure, a device for inserting a watermark is provided. The device includes a resizer configured to generate first image data by resizing original image data to a predetermined size, a watermark inserter configured to insert watermark data into the first image data, and a compensator configured to add difference data corresponding to a difference between the original image data and the first image data to second image data that is image data in which the watermark data is inserted.

The watermark data may include effective watermark data and control watermark data.

The watermark inserter may include an insertion location determiner configured to determine at least one of an insertion location of the effective watermark data and an insertion location of the control watermark data, and the watermark inserter may be further configured to insert the effective watermark data and the control watermark data into the first image data based on a result of the determining.

The watermark inserter may further include a watermark detector configured to analyze the first image data based on a pixel value of a predetermined pixel or predetermined pixel groups in the first image data and a critical detection value, and the insertion location determiner may be further configured to determine the insertion location of the effective watermark data and the insertion location of the control watermark data in the first image data based on a result of the analyzing.

The watermark detector may be further configured to compare all or some of first image frequency signals that have been converted to frequency signals based on the pixel value of the predetermined pixel or predetermined pixel groups in the first image data, with the critical detection value.

The insertion location determiner may be further configured to determine a first insertion location that is a location of a pixel or a pixel group that is determined to detect all or some of the watermark data and a second insertion location that is a location of a pixel or a pixel group that is determined to have a value that is greater or smaller than the critical detection value by a predetermined value or greater, based on a result of the comparing.

The watermark inserter may be further configured to insert the control watermark data into the first insertion location and insert the effective watermark data into the second insertion location.

The watermark inserter may be further configured to convert the effective watermark data and the control watermark data into frequency signals, and insert the frequency signals to all or some of the first image frequency signals that are converted based on the pixel value of the predetermined pixel or predetermined pixel groups in the first image data.

The compensator may resize the second image data to be the same as a size of the original image data, and adds the difference data corresponding to the difference between the original image data and the first image data to the resized second image data.

The effective watermark data may be generated based on a user input or information about the original image data.

In accordance with another aspect of the present disclosure, a device for detecting watermark data is provided. The device includes a receiver configured to receive first data in which predetermined data is inserted as watermark data, a resizer configured to resize the first data to a predetermined size, a watermark detector configured to detect the watermark data from the resized first data, and a controller configured to control the device to classify the first data or to perform a predetermined operation based on the watermark data.

The watermark data may include image information, and the first data may be image data obtained by resizing the original image data.

The first data may be generated by a server.

The first data may include audio data, and the watermark data may be generated based on a user input.

The watermark data may be generated as a block form or a packet form including at least one of a sync field representing a start of the watermark data, a length field representing a length of the watermark data, and a CRC field, an RS field, and a payload field for detecting and correcting errors.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
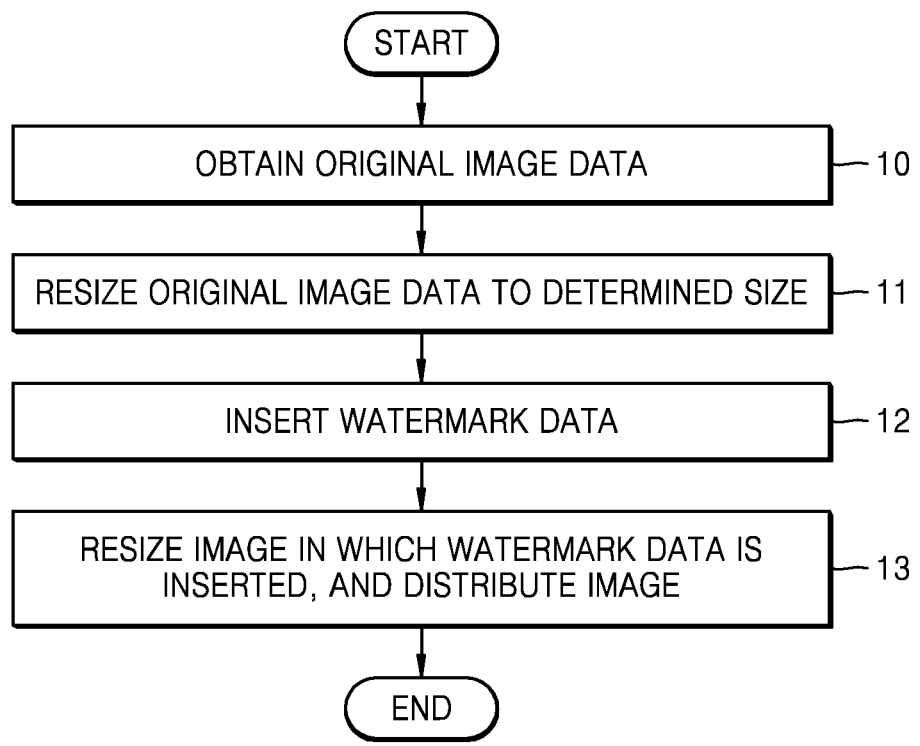
FIGS. 1A and 1B are diagrams for describing a method of inserting and extracting a watermark according to the related art.
Figure 1B:
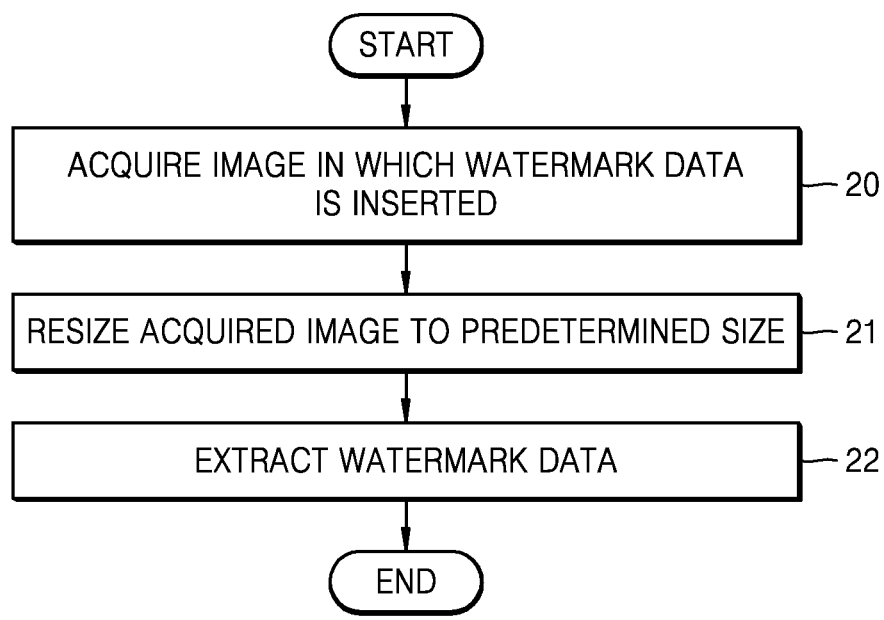

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when an element is referred to as being "connected with" another element, it can be directly connected with the other element, or electrically connected with the other element while intervening elements may also be present. It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

A "device" as used herein may include a personal computer (PC), a cellular phone, a smart phone, a television (TV), a tablet PC, a personal digital assistant (PDA), a portable multimedia player (PMP), a navigation, a Moving Picture Experts Group (MPEG-1 or MPEG-2) audio layer 3 (MP3) player, and a digital camera. However, various embodiments are not limited thereto.

A server as used herein may include a single server, a set of servers, and a cloud server, but is not limited thereto.

Watermark data as used herein may include data inserted in predetermined data for identifying copyright, ownership information, and forgery. The watermark data may be data including random numbers, or data including various information such as a logo that a user wants to insert to data, identification information such as copyright information, a user input, and data information, but is not limited thereto.

Throughout the entire specification, insertion and extraction of watermark data may be executed in various ways. For example, a device may insert watermark data in a spatial domain, or may insert watermark data in a frequency domain after converting data into a frequency signal. However, one or more embodiments are not limited to the above examples.

Throughout the entire specification, an insertion location of watermark data may denote a location in data, to which the watermark data is inserted. For example, the insertion location of the watermark data may denote a location of a predetermined pixel or a pixel group (or frequency band corresponding to a pixel) in image data, or a predetermined part in audio data.

Throughout the entire specification, a watermark key may include a user key that is used in generating watermark data, and is data that may protect the watermark data against an unauthorized user who tries to remove watermark data. For example, the watermark key may include a key used when generating watermark data that is to be inserted based on predetermined data, but is not limited thereto.

Throughout the entire specification, a predetermined location may denote a location set or determined by a user, or a location set or determined by a device, but is not limited thereto.

Figure 2:
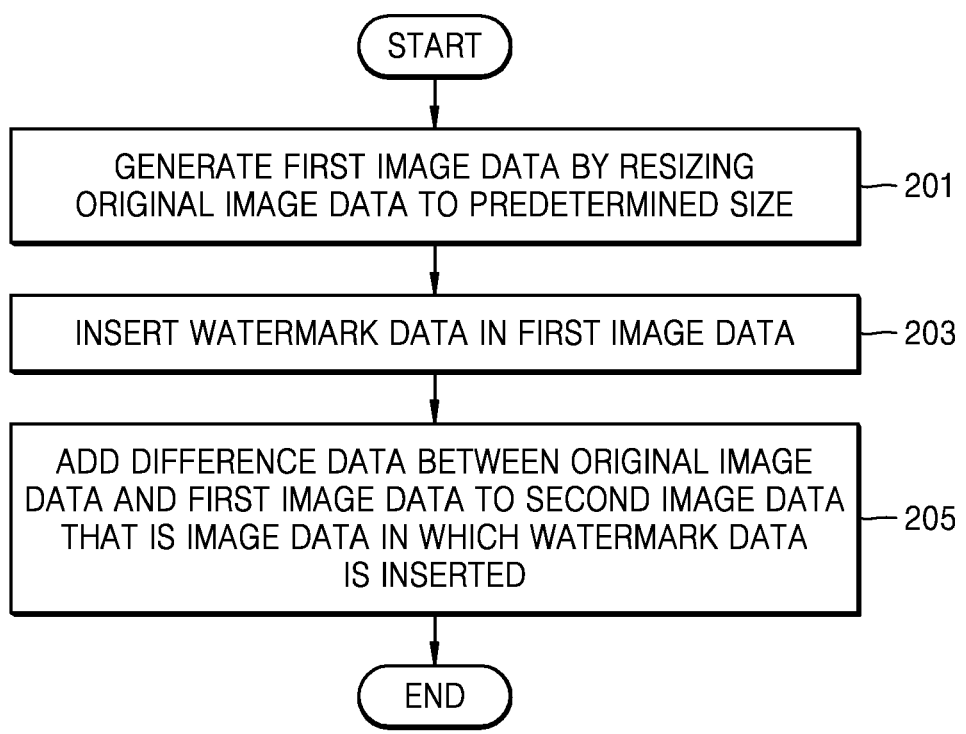
FIG. 2 is a flowchart of a method of inserting a watermark according to an embodiment of the present disclosure.

FIG. 2 is a flowchart for describing a method of inserting a watermark according to an embodiment of the present disclosure.

Referring to FIG. 2, in operation 201, a device may generate first image data that is obtained by resizing original image data to a predetermined size.

According to an embodiment of the present disclosure, a predetermined size may denote a predetermined resolution. For example, the device may change original data having a resolution of 1080×1080 to image data having a resolution of 540×540. That is, the device may generate first image data, that is, image data having a switched resolution of 540×540. However, one or more embodiments are not limited to the above example.

In operation 203, the device may insert watermark data in the first image data.

According to various embodiments of the present disclosure, the watermark data may include effective watermark data and control watermark data.

According to various embodiments of the present disclosure, the effective watermark data may denote watermark data that is to be inserted as watermark data in image data or audio data by the device. For example, the effective watermark data may include copyright information, ownership information, information about original image, and information for identifying forgery. That is, the effective watermark data may include data inserted in image data or audio data that may be extracted and identified as watermark data at a receiving end. However, one or more embodiments are not limited to the above example.

According to various embodiments of the present disclosure, the control watermark data may denote data inserted in image data or audio data to allow the watermark data to be exactly detected. For example, a false alarm may occur, that is, watermark data may not be detected even though the device inserts the watermark data, or watermark data may be detected even when the watermark data is not inserted. The control watermark data may denote data inserted by the device in order to prevent occurrence of the false alarm. That is, the watermark data that is inserted to allow the effective watermark data to be detected accurately may be the control watermark data.

According to various embodiments of the present disclosure, the device may determine at least one of the insertion location of the effective watermark data and the insertion location of the control watermark data. That is, the device may determine the effective watermark data has to be inserted to which part of the first image data, and the control watermark data has to be inserted to which part of the first image data. The device may insert the effective watermark data and the control watermark data in the first image data, according to the determination result.

According to various embodiments of the present disclosure, the device may analyse the first image data based on a predetermined pixel value and a critical detection value in the first image data. That is, the device may compare each pixel value or pixel group values of a predetermined group with a critical detection value of the watermark data to analyse the first image data. In other words, the first device may analyse the first image data before inserting the watermark data, and thereby determining insertion locations of the effective watermark data and the control watermark data.

According to various embodiments of the present disclosure, the critical detection value is a value that is used when the device detects the watermark data, that is, the device may determine that the watermark data has been inserted when a pixel value or a signal intensity value is greater or smaller than the detection critical value by a predetermined value. That is, the detection critical value may include a predetermined signal intensity value or a predetermined pixel value, but is not limited thereto.

According to various embodiments of the present disclosure, the device may compare entire or partial first image frequency signals that have been converted based on a pixel value of a predetermined pixel or predetermined pixel groups in the first image data, with the critical detection value. That is, the device may convert the first image data into the frequency signals based on the pixel value in the image data, and then may compare an intensity of the converted signal with the critical detection value.

According to various embodiments of the present disclosure, the device may determine a first insertion location that is a location of a pixel or a pixel group determined to detect entire or partial effective watermark data. That is, the device may find a location where the effective watermark data may be detected based on the critical detection value, even though the effective watermark data is not inserted.

According to various embodiments of the present disclosure, the device may insert the control watermark data to the first insertion location. That is, the device may control the effective watermark data not to be detected from a portion to which the effective watermark data is not inserted, by inserting the control watermark data in the first insertion location.

According to various embodiments of the present disclosure, the device may determine a second insertion location that is a location of a pixel or a pixel group that is determined to have a value that is smaller or greater than the critical detection value by a predetermined value or greater. That is, the device may find the location where the effective watermark data may be exactly detected based on the critical detection value, by inserting the effective watermark data.

In general, a signal intensity of the watermark data is smaller than a signal intensity of the image data, and when the watermark data having a predetermined signal intensity or greater is inserted, the image data may be largely deformed. Therefore, the device may determine a location in the image data, where the effective watermark data may be exactly detected even when the effective watermark data of a predetermined signal intensity or less is inserted so as not to largely deform the image data, and then, may insert the effective watermark data.

According to various embodiments of the present disclosure, the device may convert at least one of the effective watermark data and the control watermark data into a frequency signal that is to be inserted in the first image data.

In operation 205, the device may add difference data between original image data and the first image data to second image data, in which the watermark data is inserted.

As described above with reference to operation 201, the device generates the first image data by resizing the original image data in order to insert the watermark data. Here, according to the resizing of the original image data, there may be lost data. For example, when the original image data has a resolution of 1080×1080 and the first image data has a resolution of 540×540, 540 pixel values are omitted in each of transverse and longitudinal directions while generating the first image data from the original image data. That is, there is lost data according to the resizing operation. Even if the device expands the first image data again, the lost data is not reconstructed.

According to various embodiments of the present disclosure, the device may insert the difference data between the original image data and the first image data to the second image data, that is, the image where the watermark data is inserted in the first image data. The difference data is the lost data when the first image data is generated from the original image data, and may denote difference between the original image data and the first image data. For example, the difference data may denote data that is deleted when the first image data is generated from the original image data.

The device may add the lost data due to the resizing in operation 201 after inserting the watermark data in the first image data, and then, may compensate for the difference between image qualities of the original image data and the image data in which the watermark data is inserted.

According to various embodiments of the present disclosure, the device may resize the second image data to be the same as the original image data, and may add the difference data between the original image data and the first image data to the second image data.

According to various embodiments of the present disclosure, the device may transmit third image data that is obtained by adding the difference data to the second image data to another device or a server.

In addition, according to various embodiments of the present disclosure, the effective watermark data may be generated based on a user input or data information of the original image data. That is, the device generates a bitstream or a packet based on the user input or the data information of the original image, and inserts the bitstream or the packet in the original image data as the effective watermark data to be transmitted to another device.

Another device receiving the data in which the effective watermark data is inserted extracts the effective watermark data, and may execute a predetermined operation or control the data, in which the watermark data is inserted, based on the extracted watermark data.

Figure 3:
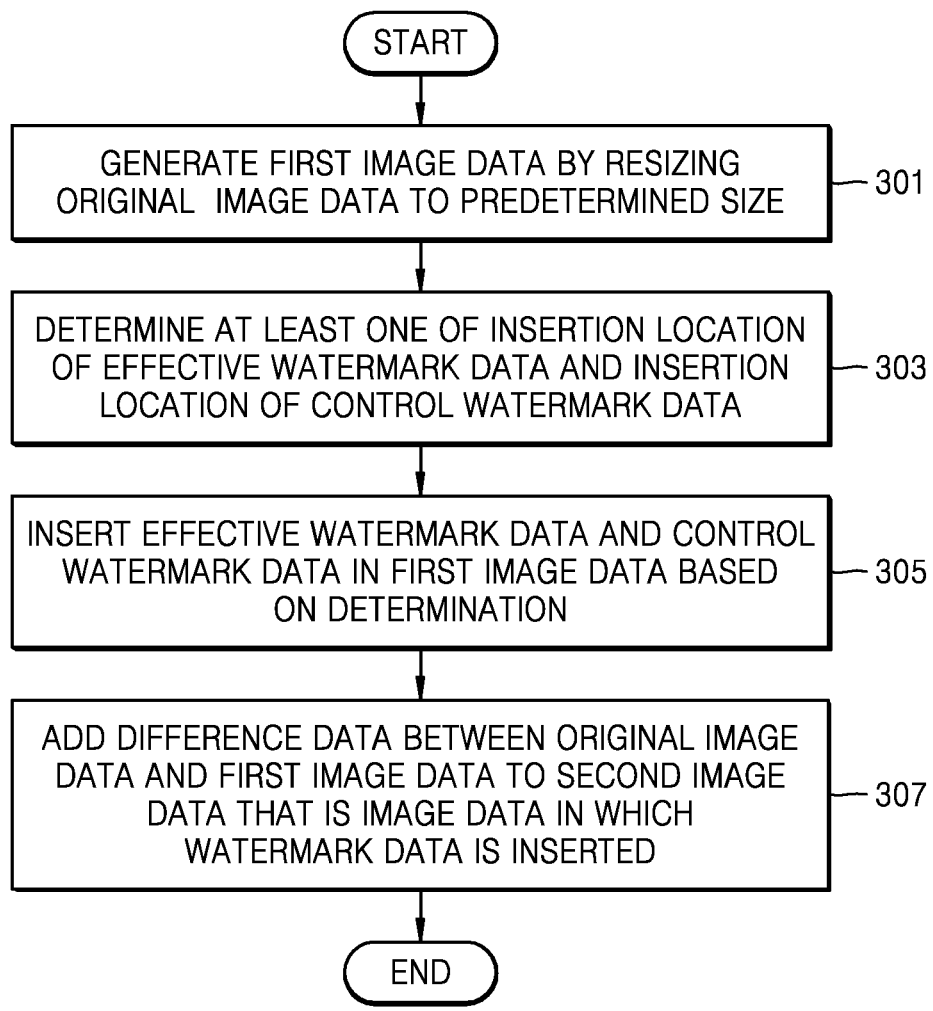
FIG. 3 is a flowchart of a detailed process of the method of inserting a watermark according to an embodiment of the present disclosure.

FIG. 3 is a flowchart for describing detailed processes of the method of inserting watermark according to an embodiment of the present disclosure.

Referring to FIG. 3, in operation 301, the device may generate first image data by resizing original image data to a predetermine size. This is described above with reference to FIG. 2, and thus, detailed descriptions are omitted.

In operation 303, the device may determine at least one insertion location from among an insertion location of effective watermark data and an insertion location of control watermark data.

According to various embodiments of the present disclosure, watermark data may include the effective watermark data and the control watermark data. The effective watermark data may include watermark data that is information about copyright and source that is inserted into predetermined data by the device and is inserted so that a receiving end may extract and identify inserted data.

The control watermark data may include data that is inserted to allow the effective watermark data to be exactly detected. For example, the control watermark data may be data that adjusts pixel values in the image data or a signal intensity of the image data, as described above with reference to FIG. 2.

According to one or more embodiments of the present disclosure, the device may determine which part of the first image data the effective watermark data has to be inserted, and which part of the first image data the control watermark data has be inserted. The device may compare the pixel value of a predetermined pixel or predetermined pixel groups in the first image data or a signal intensity converted based on the pixel value, with a critical detection value used to detect the watermark data, so as to determine whether the watermark data is detected from the first image data.

That is, the device may determine that the watermark data is inserted when the pixel value or the signal intensity value in the first image data is greater or smaller than the critical detection value by a predetermined value. According to various embodiments of the present disclosure, the signal intensity value may denote a peak value of a signal.

According to various embodiments of the present disclosure, the critical detection value is used when the device detects the watermark data, and may include a value regarding a predetermined signal intensity or a predetermined pixel value. According to various embodiments of the present disclosure, the critical detection value may show a predetermined waveform.

According to various embodiments of the present disclosure, the device may compare entire or some of first image frequency signals that have been converted based on a predetermined pixel value in the first image data, with the critical detection value. That is, the device may convert the first image data into the frequency signals based on the pixel value in the image data, and may compare the signal intensity of the frequency signals with the critical detection value.

According to one or more embodiments of the present disclosure, the device may determine a first insertion location that is a location of a pixel or a pixel group that is expected to detect the effective watermark data. That is, the device may find the location where the effective watermark data may be detected, based on the critical detection value even though the effective watermark data is not inserted yet.

For example, the device may convert a predetermined part in the first image data into a frequency signal via a discrete Fourier transformation (DFT) operation, based on the pixel value of a predetermined pixel or a predetermined pixel group in the first image data. After that, the device multiplies the frequency signal with a predetermined signal sequence (e.g., pseudo noise (PN) sequence) that is used when inserting effective watermark bits, in order to calculate a peak value of the frequency signal that has been multiplied with the predetermined signal sequence. The device may determine whether the watermark data is detected from the first image data by comparing the peak value with a critical value. One or more embodiments are not limited to the above example, and the method of detecting the watermark data varies depending on each embodiment.

In operation 305, the device may insert the effective watermark data and the control watermark data into the first image data, based on the determination result.

According to various embodiments of the present disclosure, the device may insert the control watermark data to the first insertion location. That is, the device may insert the control watermark data to the first insertion location so as to control the watermark data not to be detected from a portion where the effective watermark data is not inserted.

For example, the first insertion location may denote a predetermined part in the first image data, on which the frequency signal has a value within a predetermined range from the critical detection value. For example, when it is assumed that the critical detection value is 0.8, the device may determine a predetermined part in the first image data, on which the signal intensity value of the frequency signal or the peak value of the signal obtained by multiplying the frequency signal with a predetermined signal sequence ranges from 0.6 to 0.8, as the first insertion location.

According to various embodiments of the present disclosure, the device may determine a second insertion location that is a location of a pixel or a pixel group that is determined to have a value that is greater or smaller than the critical detection value by a predetermined value. That is, the device may determine a location where the effective watermark data may be exactly detected based on the critical detection value, by inserting the effective watermark data.

For example, when it is assumed that the critical detection value is 0.8, the device may determine a predetermined part in the first image data, on which the signal intensity of the frequency signal or the peak value of the signal obtained by multiplying the frequency signal with a predetermined signal sequence is 0.8 or greater, as the second insertion location. When the effective watermark data is inserted to the second insertion location, even if the device does not insert the effective watermark data with a strong signal intensity, the device detecting the watermark data may exactly detect the effective watermark data, and the original image data is not much deformed.

According to one or more embodiments of the present disclosure, the effective watermark data and the control watermark data may be inserted to the predetermined part of the first image data in a spread-spectrum manner, but is not limited thereto.

In operation 307, the device may add difference data between the original image data and the first image data to second image data, in which the watermark data has been inserted. Since operation 307 corresponds to the description above with reference to FIG. 2, detailed descriptions thereof are omitted.

Figure 4A:
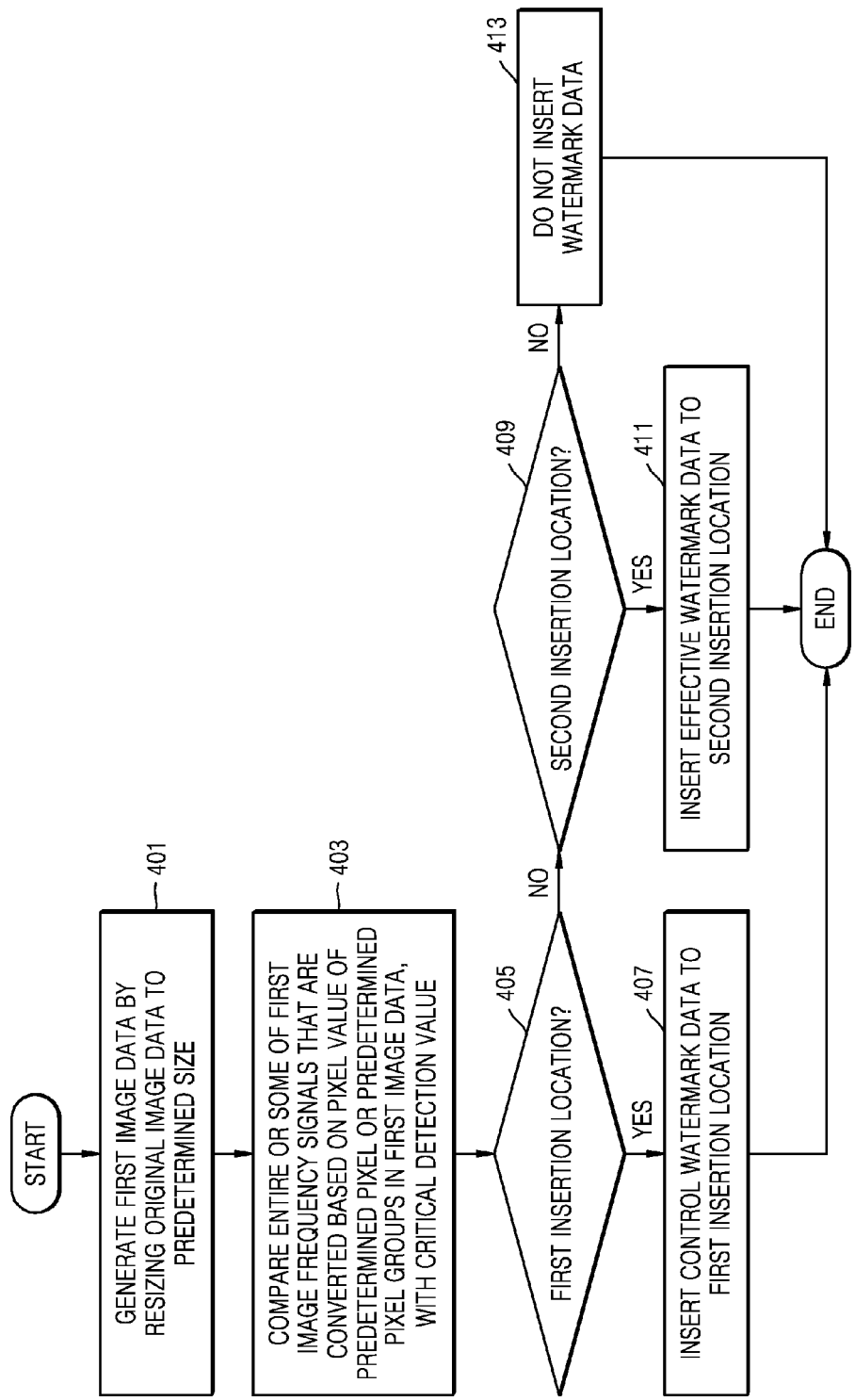
FIG. 4A is a flowchart of a method of determining an insertion location of watermark data according to an embodiment of the present disclosure.

FIG. 4A is a flowchart for describing a method of determining an insertion location of the watermark data according to an embodiment of the present disclosure.

Referring to FIG. 4A, in operation 401, the device may generate first image data by resizing original image data to a predetermined size, and detailed descriptions of operation 401 correspond to the above description and thus are omitted.

In operation 403, the device may compare entire or some of first image frequency signals that have been converted based on a pixel value of a predetermined pixel or predetermined pixel groups in the first image data, with a critical detection value.

According to various embodiments of the present disclosure, the frequency signal of the first image may include a frequency signal of a predetermined part of the first image data. The device may compare a peak value of a predetermined part, wherein the peak value is calculated based on a frequency signal on a predetermined part of the first image data and a predetermined signal sequence, with the critical detection value.

According to one or more embodiments of the present disclosure, the predetermined signal sequence may be used to spread the effective watermark data to a predetermined band.

In operation 405, the device may determine whether a predetermined location in the first image data is the first insertion location.

According to various embodiments of the present disclosure, the first insertion location may be a predetermined part in the first image data, on which a converted frequency signal has a value within a predetermined range from the critical detection value.

According to various embodiments of the present disclosure, a criterion used to determine the critical detection value or the first insertion location may be determined according to the device that inserts the watermark data or the device that detects the watermark data.

In operation 407, the device may insert the control watermark data to the first insertion location. The device may reduce a wrong operation in detecting the effective watermark data by inserting the control watermark data to the first insertion location.

In operation 409, the device may determine whether a predetermined location in the first image data is a second insertion location.

According to various embodiments of the present disclosure, the second insertion location is a location of a pixel or a pixel group that is determined to have a value that is greater or smaller than the critical detection value by a predetermined value.

According to various embodiments of the present disclosure, a criterion used to determine the second insertion location may be determined by the device that inserts the watermark data or the device that detects the watermark data.

In operation 411, the device may insert the effective watermark data to the second insertion location.

According to various embodiments of the present disclosure, the device may determine whether the predetermined location in the first image data is the second insertion location, after determining whether the predetermined location is the first insertion location. That is, an order of determining the first insertion location and the second insertion location may vary depending on each of the embodiments of the present disclosure.

In operation 413, the device may not insert the watermark data. That is, the device may not insert the watermark data to a predetermined part of the first image data, which is not determined as the first insertion location or the second insertion location.

Figure 4B:
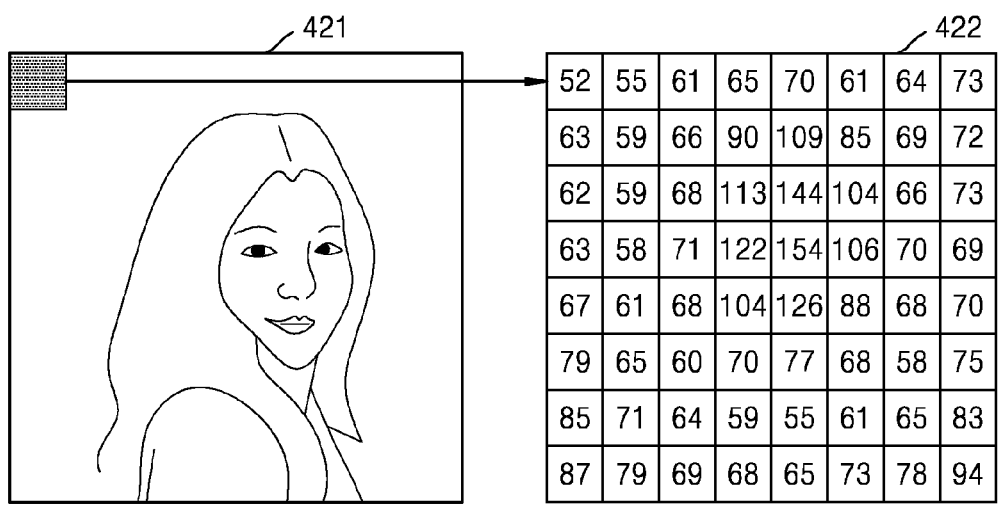
FIG. 4B is a diagram for describing a method of inserting watermark data according to an embodiment of the present disclosure.

FIG. 4B is a diagram for describing a method of inserting watermark data according to an embodiment of the present disclosure.

Referring to FIG. 4B, a first image 421 may be obtained by resizing an original image to a predetermined size.

According to various embodiments of the present disclosure, a device may select a predetermined portion of the first image 421 in order to convert the first image 421 into a frequency signal. Referring to FIG. 4B, the device may select an 8×8 block in the first image 421. The device may convert a pixel value 422 of the selected 8×8 block into a frequency signal, and may insert watermark data before or after converting the 8×8 block into the frequency signal.

According to one or more embodiments of the present disclosure, the watermark data may be generated by multiplying data that a user wants to insert with a predetermined signal sequence. The signal sequence may be generated by using a watermark key.

According to one or more embodiments of the present disclosure, the device may select an entire part of the first image, and may convert the selected part into the frequency signal and insert the watermark data.

Figure 5:
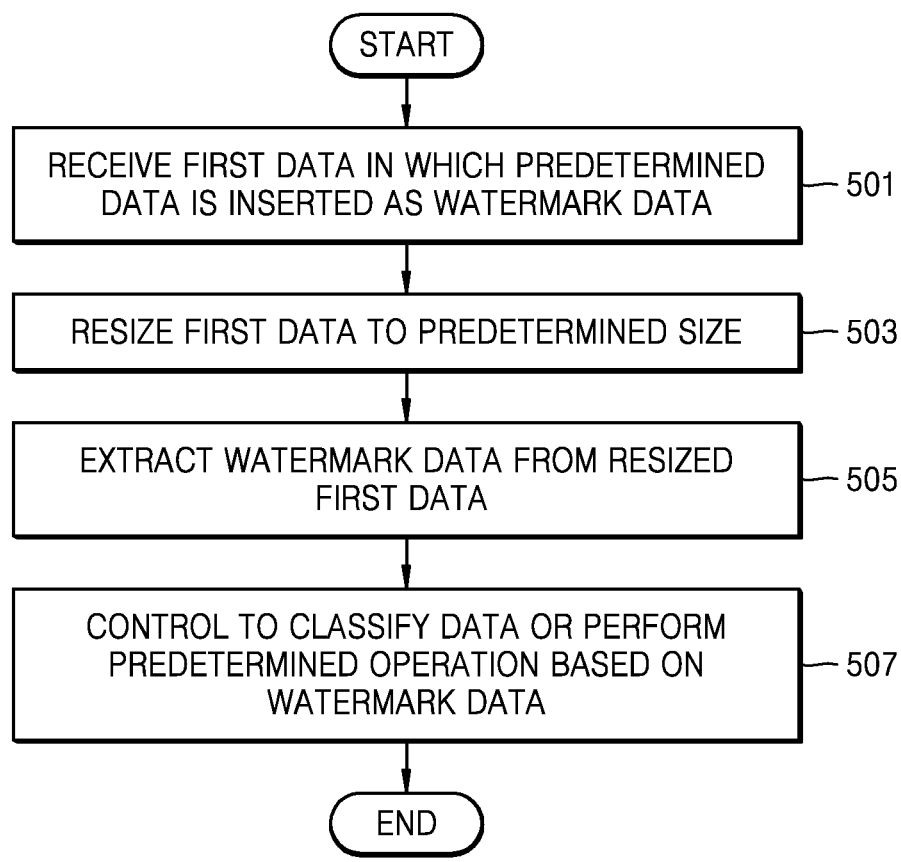
FIG. 5 is a flowchart of a method of extracting watermark data according to an embodiment of the present disclosure.

FIG. 5 is a flowchart for describing a method of detecting watermark data according to an embodiment of the present disclosure.

Referring to FIG. 5, in operation 501, a device may receive first data, in which predetermined data is inserted as watermark data.

According to various embodiments of the present disclosure, the predetermined data may be image data or audio data, but is not limited thereto.

According to various embodiments of the present disclosure, the first data that the device has received may be data that is generated by resizing original data to a predetermined size and inserting watermark data. Alternately, the first data may include difference data between the original data and resized data, as well as the watermark data, inserted therein.

According to various embodiments of the present disclosure, the watermark data inserted in the first data may be generated based on information of the original data. For example, the device that inserts the watermark data generates the watermark data based on information about the original data, resizes the original data to a predetermined size, and inserts the generated watermark data.

According to various embodiments of the present disclosure, the watermark data inserted in the first data may include effective watermark data and control watermark data. According to one or more embodiments of the present disclosure, the effective watermark data may be generated based on the information about the original data.

According to various embodiments of the present disclosure, the information about the original data may include various pieces of information such as generation date and time of the original data, a generator of the original data, a size of the original data, a resolution of the original data, a file format of the original data, a compression type of the original data, etc., but is not limited thereto.

For example, if the first data is image data, the information about the original data may include information about objects included in the original image, and information about a resolution of the original data, and if the first data is audio data, the information about the original data may include artist of the audio data, and a file format of the audio data.

According to various embodiments of the present disclosure, the first data may be generated by a server. That is, the server may generate the first data, in which the watermark data is inserted, by itself, or may receive predetermined data, in which the watermark data is inserted, and resize the predetermined data. For example, the server may receive a predetermined image, in which watermark data is inserted, from another device, and may generate a thumbnail image of the predetermined image. The device may receive the thumbnail image generated by the server, and the thumbnail image also includes the watermark data inserted therein.

According to various embodiments of the present disclosure, the watermark data may be generated based on a user input. According to various embodiments of the present disclosure, the watermark data may include control information generated based on the user input. The control information may include various control information such as volume adjustment, a sound field selection, and play and stop, but is not limited thereto.

According to one or more embodiments of the present disclosure, the watermark data may be generated as a block or a packet including at least one of a sync field representing a start of the watermark data, a length field representing a length of the watermark data, a cyclic redundancy check (CRC) field, an RS field, and a payload field for detecting and correcting errors. The RS field may be a field including data about a reference signal or data about a Reed-Solomon code.

For example, when a PC transmits audio data to a speaker, the PC generates control information based on a user input that the PC has received, and generates watermark data based on the control information. The PC inserts the watermark data in the audio data and transmits the audio data to the speaker, and the speaker extracts the watermark data from the audio data transmitted from the PC and controls input and output of the audio data based on the control information in the watermark data. Otherwise, the PC may generate the watermark data as a packet or a block having a predetermined format, and may insert the watermark data in the audio data and transmit the audio data to the speaker.

In operation 503, the device may resize the first data to a predetermined size.

According to various embodiments of the present disclosure, the device may resize the first data to a predetermined size in order to extract the watermark data from the first data. The device may resize the first data to the size of the original data when the original data has been resized when the watermark data is inserted. In more detail, since the original data has been resized to a predetermined size when inserting the watermark data, the device may resize the first data to a size when the watermark data is inserted, and then, may extract watermark data from the first data that has been resized.

According to various embodiments of the present disclosure, the predetermined size may be determined by another device or the user input.

In operation 505, the device may extract the watermark data from the first data that has been changed to the predetermined size.

According to various embodiments of the present disclosure, the device may compare a pixel value of a predetermined pixel or predetermined pixel groups in the first data that has been resized to the predetermined size or an intensity of a signal converted based on the pixel value, with a critical detection value that is used to detect the watermark data in order to detect the watermark data from the first data that has been resized to the predetermined size. That is, the device compares the pixel value or the signal intensity value with the critical detection value, and determines that the watermark data is inserted when the pixel value or the signal intensity value is greater or smaller than the critical detection value by a predetermined value. According to one or more embodiments of the present disclosure, the signal intensity value may include a peak value of the signal.

According to various embodiments of the present disclosure, the critical detection value is used when the device detects the watermark data, and may include a predetermined signal intensity value or a predetermined pixel value. In addition, according to one or more embodiments of the present disclosure, the critical detection value may have a predetermined waveform.

According to various embodiments of the present disclosure, the device may compare frequency signals of entire or some of the first data, which are converted based on the pixel value of a predetermined pixel or the predetermined pixel groups in the first data that has been converted into the predetermined size, with the critical detection value.

For example, when the first data is an image, the device may convert a predetermined part of the first data that is resized to a predetermined size into the frequency signal through a DFT calculation. After that, the device multiplies the frequency signal with a predetermined signal sequence (e.g., a PN sequence) that is used when the effective watermark data is inserted in the frequency signal, calculates a peak value of the frequency signal that is multiplied with the predetermined signal sequence, and compares the peak value with the critical value in order to determine whether the watermark data is detected. However, one or more embodiments are not limited to the above example, and the watermark data may be detected in different ways according to the embodiments.

According to various embodiments of the present disclosure, the device acquires each bit of the watermark data from the predetermined part of the first data that is resized, and may reconstruct the data that has been inserted as the watermark data based on the acquired bits.

In operation 507, the device may classify data or perform a predetermined operation based on the watermark data.

According to various embodiments of the present disclosure, the device may execute a command included in the watermark data based on the watermark data or may classify the first data based on information included in the watermark data.

For example, when the watermark data included in the first data includes information about the first data, the device may store the first data based on the information about the first data or may display or provide the information about the first data to the user. Also, when the watermark data included in the first data includes control information of the user or a command requesting a predetermined operation, the device may perform a predetermined operation or control the device based on the control information of the user.

According to various embodiments of the present disclosure, the device illustrated in FIG. 5 is a device for extracting the watermark data, wherein the device may be equal to or different from the device that inserts the watermark data. That is, one device may insert and extract the watermark data.

Figure 6A:
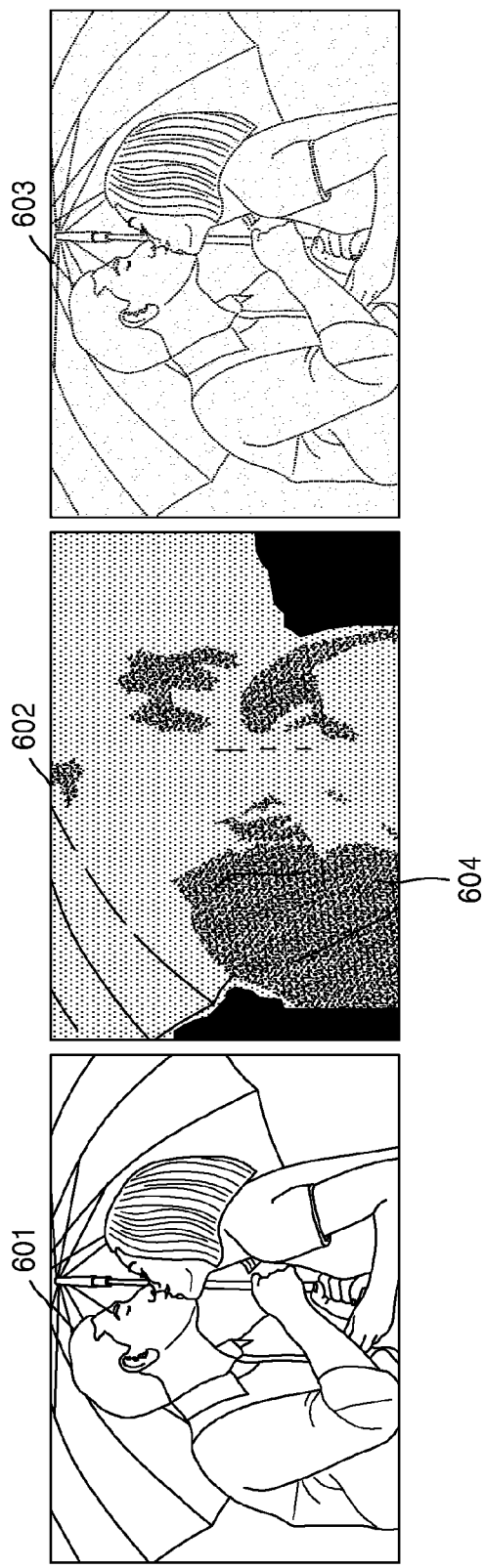
FIGS. 6A and 6B are diagrams for describing data loss according to the method of inserting and extracting the watermark according to an embodiment of the present disclosure.
Figure 6B:
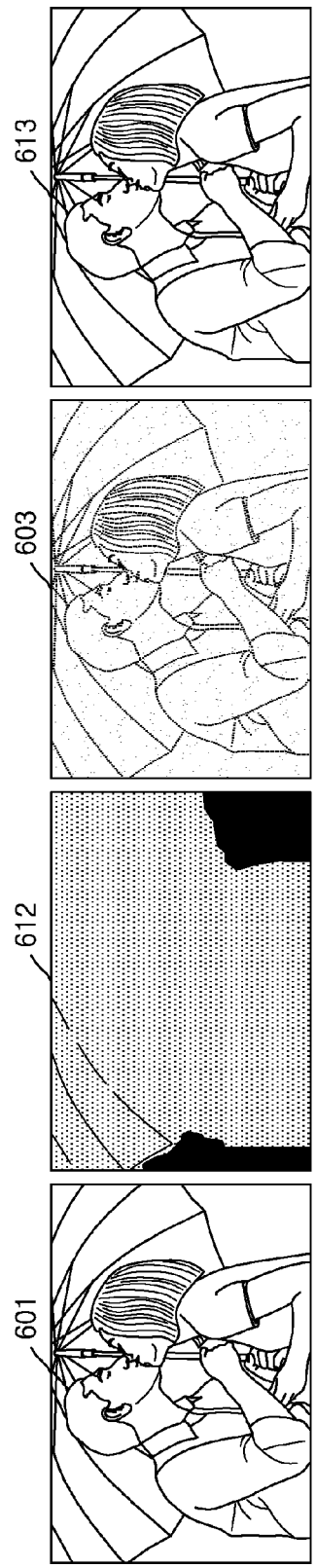

FIGS. 6A and 6B are diagrams for describing loss of data according to a method of inserting and extracting the watermark according to an embodiment of the present disclosure.

Referring to FIG. 6A, the device generates first image data that is obtained by resizing original image data 601 to a predetermined size for inserting the watermark data, and generates second image data 603 that is obtained by inserting the watermark data in the first image data. FIG. 6A shows the original image data 601, the second image data 603, and a picture 602 representing a difference between the original image data 601 and the second image data 603.

According to various embodiments of the present disclosure, the device resizes the original image data to a predetermined size, when the watermark data is inserted. When the original image data is resized to a predetermined size, some of the data in the original image data may be lost. That is, in the picture 602 representing the original image data 601 and the signal of the second image data 603 shown in FIG. 6A, a portion 604 represented in a dark shade shows that there is a large signal difference between the original data 601 and the second image data 603. That is, the second image data 603 has image quality that is inferior to that of the original image data 601.

For example, when the original image data 601 has a resolution of about 3560×2426, the device may change the resolution of the original image data 601 into a resolution of 800×600. Even if the device changes the resolution of the second image data 603, in which the watermark data is inserted, to the resolution of 3560×2426 again, the second image data 603 has an inferior quality to that of the original image data 601 unless lost image data is compensated for.

That is, even when the device changes the resolution of the second image data 603 to be the same as that of the original image data, an effect such as blurring occurs, image quality degrades comparing with the original image data 601. Also, if the resolution is further reduced after inserting the watermark data in the first image data 603, the watermark data may not be exactly detected.

Referring to FIG. 6B, the device generates the first image data by resizing the original image data 601 in order to insert the watermark data, and generates the second image data 603 by inserting the watermark data in the first image data. Also, the device generates third image data 613 that is obtained by inserting difference data between the original image data 601 and the first image data to the second image data 603.

According to various embodiments of the present disclosure, the device may generate the second image data 603 by resizing the original image data 601 and inserting the watermark data. The device changes a resolution of the second image data 603 to the same resolution as that of the original image data 601, and inserts the difference data between the original image data and the second image data 603. That is, the image data that is lost when the resolution of the original image data 601 is changed may be compensated for.

When comparing the picture 602 representing the difference between the original image data 601 and the signal of the second image data 603 shown in FIG. 6A with the picture 612 representing the difference between the original image data 601 and the signal of the third image data 613 shown in FIG. 6B, the picture 612 of FIG. 6B does not include the dark shade like in the picture 603 of FIG. 6A. That is, since the device compensates for the image data that has been lost when generating the third image data 613, the image quality of the third image data 613 does not degrade that much comparing with the original image data 601.

For example, when the resolution of the original image data 601 is 3560×2426, the device may change the resolution of the original image data 601 to a resolution of 800×600 in order to insert the watermark data. When the device 603 changes the resolution of the second image data 603 that is obtained by inserting the watermark data to the image of the resolution of 800×600 to the resolution of 3560×2426 again, the device may insert or compensate for the image data that has been lost when the resolution of 3560×2426 is changed to the resolution 800×600 and then may generate the third image data 613. Therefore, the image quality of the third image data 613 is not much lower than that of the original image data 601.

Figure 7A:
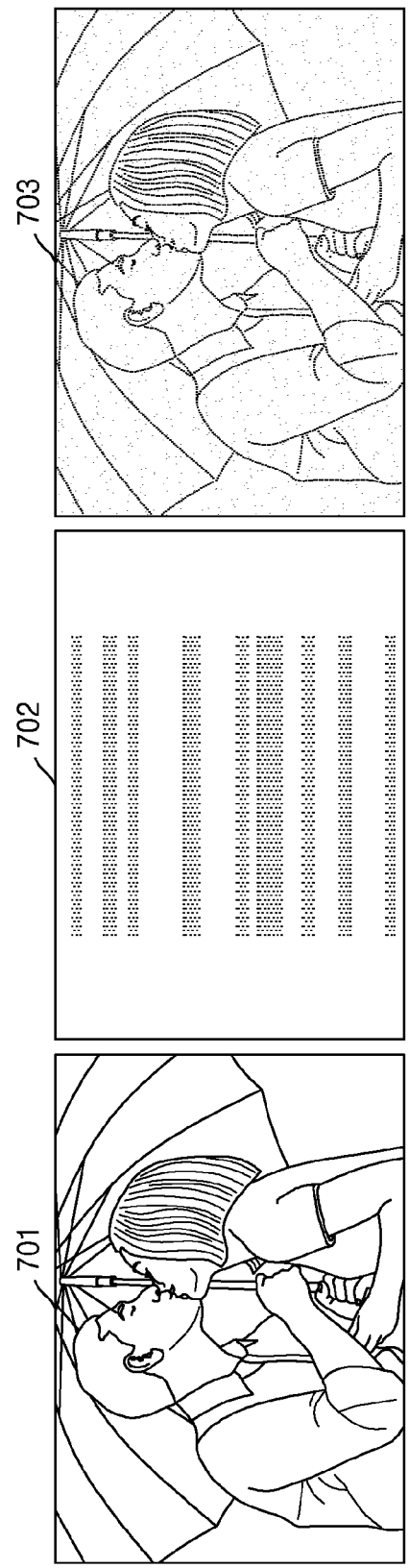
FIGS. 7A and 7B are diagrams for showing an accuracy of detecting watermark data in the method of inserting and extracting a watermark according to an embodiment of the present disclosure.
Figure 7B:
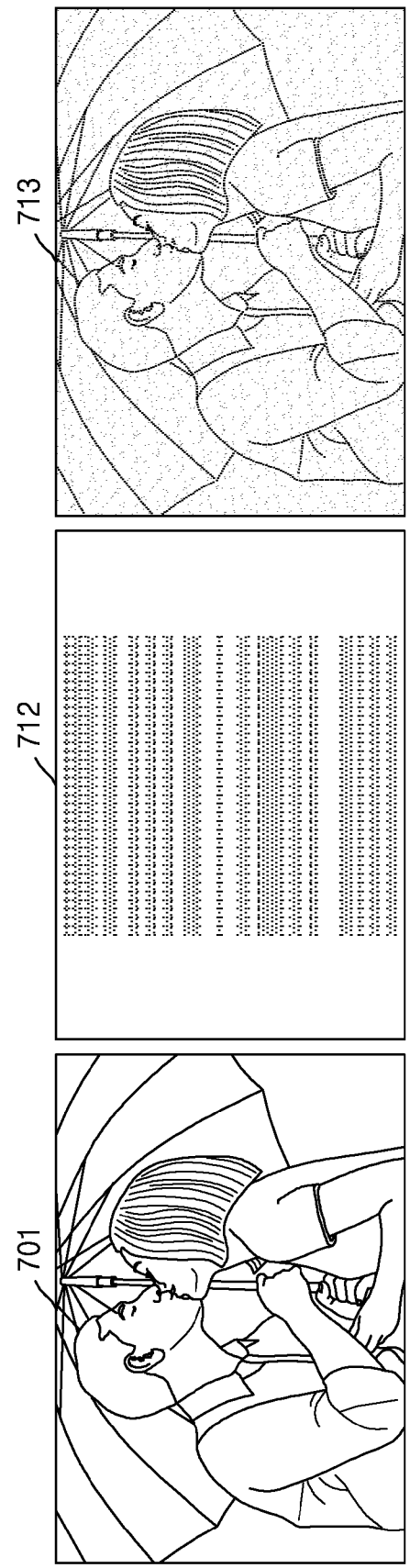

FIGS. 7A and 7B are diagrams for describing an accuracy of detecting watermark data in a method of inserting and extracting the watermark data according to an embodiment of the present disclosure.

FIG. 7A shows original image data 701, first image data 703 in which effective watermark data is only inserted, and a signal 702 of the effective watermark data inserted in the first image data 703.

FIG. 7B shows the original image data 701, second image data 713 in which the effective watermark data and control watermark data are inserted, and a signal 712 of the effective watermark data and the control watermark data inserted in the second image data 713.

Referring to FIGS. 7A and 7B, the first image data 703 and the second image data 713 do not have a large difference from each other in image quality. Unlike the first image data 703, the signal 712 of the effective watermark data and the control watermark data having an amount of data greater than that of the signal 702 of the effective watermark data is inserted in the second image data 713, but the control watermark data is a predetermined value for adjusting the pixel value, the signal intensity, or the peak value so as to exactly detect the effective watermark data, that is, the control watermark data does not largely deform the image data.

According to various embodiments of the present disclosure, when a control watermark bit is separately inserted, the image data in which the watermark data is inserted is not much different from the original image data, and at the same time, the device may exactly detect the effective watermark bit. For example, when 130 effective watermark bits are inserted, the device may detect 169 effective watermark bits from the image data in which the control watermark bit is not inserted. That is, the device may not exactly detect the effective watermark bits. However, the device may detect 130 effective watermark bits from image data, in which 339 control watermark bits are inserted with 130 effective watermark bits. That is, the device may exactly detect the effective watermark bits.

Figure 8:
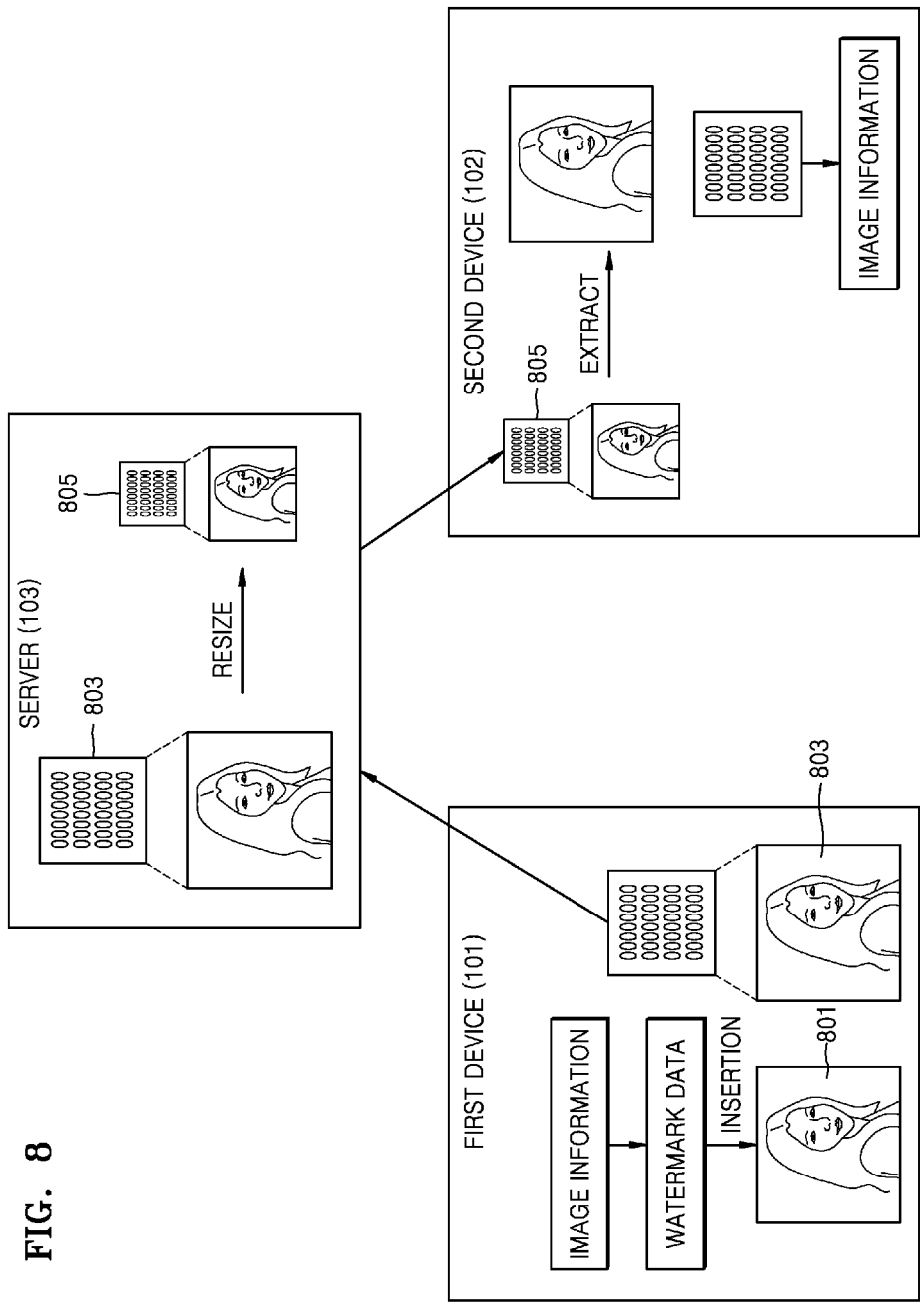
FIG. 8 is a diagram of a system of inserting image information as watermark data according to an embodiment of the present disclosure.

FIG. 8 is a diagram of a system of inserting image information as watermark data according to an embodiment of the present disclosure.

According to various embodiments of the present disclosure, a first device 101 generates image information as watermark data. For example, the first device 101 generates image information as a bitstream, and multiplies the bitstream with a predetermined bit string to generate the watermark data.

Referring to FIG. 8, according to various embodiments of the present disclosure, the first device 101 resizes original image data 801 to a predetermined size, and then, inserts the watermark data. The first device 101 may add some of the original image data, which has been lost when the original image data 801 is resized to a predetermined size, to first image data 803 in which the watermark data is inserted. Also, the first device 101 may resize the first image data 803. The insertion of the watermark data and the resizing are described above, and thus, detailed descriptions thereof are omitted.

According to various embodiments of the present disclosure, the first device 101 may transmit the first image data 803 to a server 103.

According to various embodiments of the present disclosure, the server 103 may receive the first image data 803. The server 103 may resize the first image data 803. For example, the server 103 may generate a thumbnail image or a preview image of the first image data 803, in which the watermark data is inserted. The server 103 may generate second image data 803 by changing the size of the first image data 803.

According to various embodiments of the present disclosure, the server 103 may extract the watermark data from the first image data 803 or the second image data 805. In addition, according to one or more embodiments of the present disclosure, the server 103 may transmit the second image data 805 to a second device 102.

According to various embodiments of the present disclosure, the second device 102 may extract the watermark data from the second image data 805. The second device 102 may acquire information about the original image data 801 from extracted watermark data.

Figure 9:
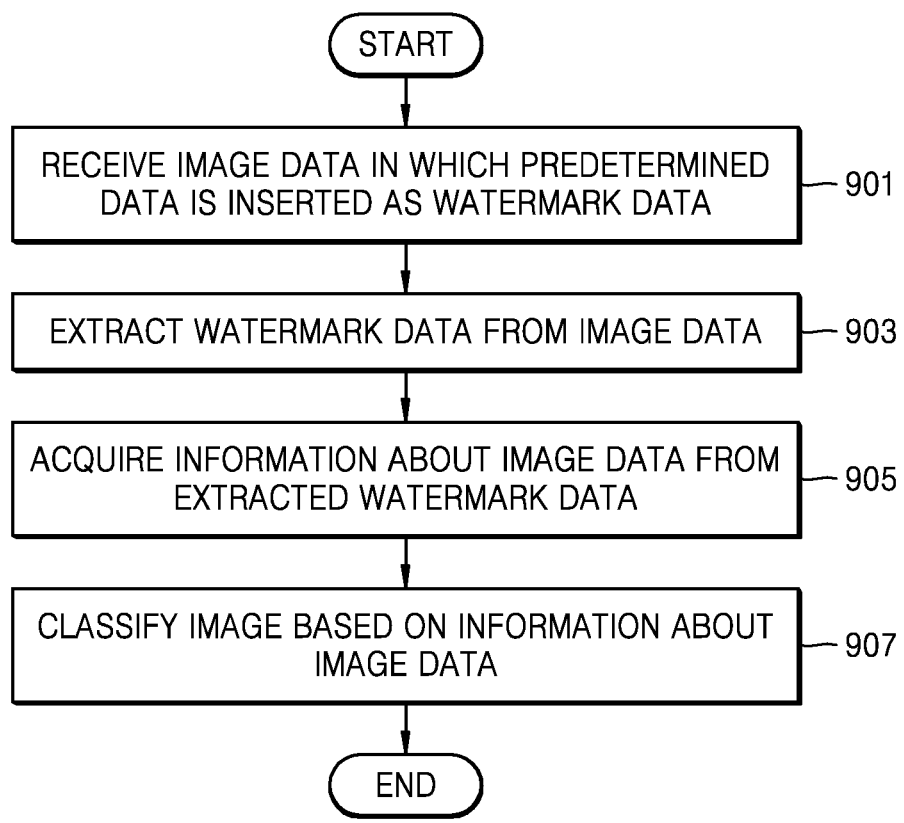
FIG. 9 is a flowchart of processes of extracting watermark data from data, in which image information is inserted as watermark data according to an embodiment of the present disclosure.

FIG. 9 is a flowchart for describing a method of extracting watermark data from data, in which image information is inserted as watermark data according to an embodiment of the present disclosure.

Referring to FIG. 9, in operation 901, a device may receive image data, in which predetermined data is inserted as watermark data.

According to various embodiments of the present disclosure, the predetermined data may include information about the image data, in which the watermark data is inserted. In addition, according to various embodiments of the present disclosure, the image data transmitted to the device may be a thumbnail image or a preview image. That is, the image data transmitted to the device may include an image generated by a server or an image that is resized by the server.

In operation 903, the device extracts the watermark data from the image data.

According to various embodiments of the present disclosure, the device may resize the image data received in operation 901, in order to extract the watermark data from the image data as described above, but is not limited thereto.

In operation 905, the device may acquire information about the image data from extracted watermark data.

According to various embodiments of the present disclosure, the device has to perform an additional analysis process or has to receive information about the image data separately, in order to acquire the information about the image data. However, if the information about the image data is included in the watermark data, the device may acquire the information about the image data by detecting the watermark data, without performing an additional analysis or further receiving the information.

In operation 907, the device may classify the image data based on the information about the image data. In addition, according to one or more embodiments of the present disclosure, the device may display the information about the image data, and may transmit a request for the original image data to the server based on a user input.

Figure 10:
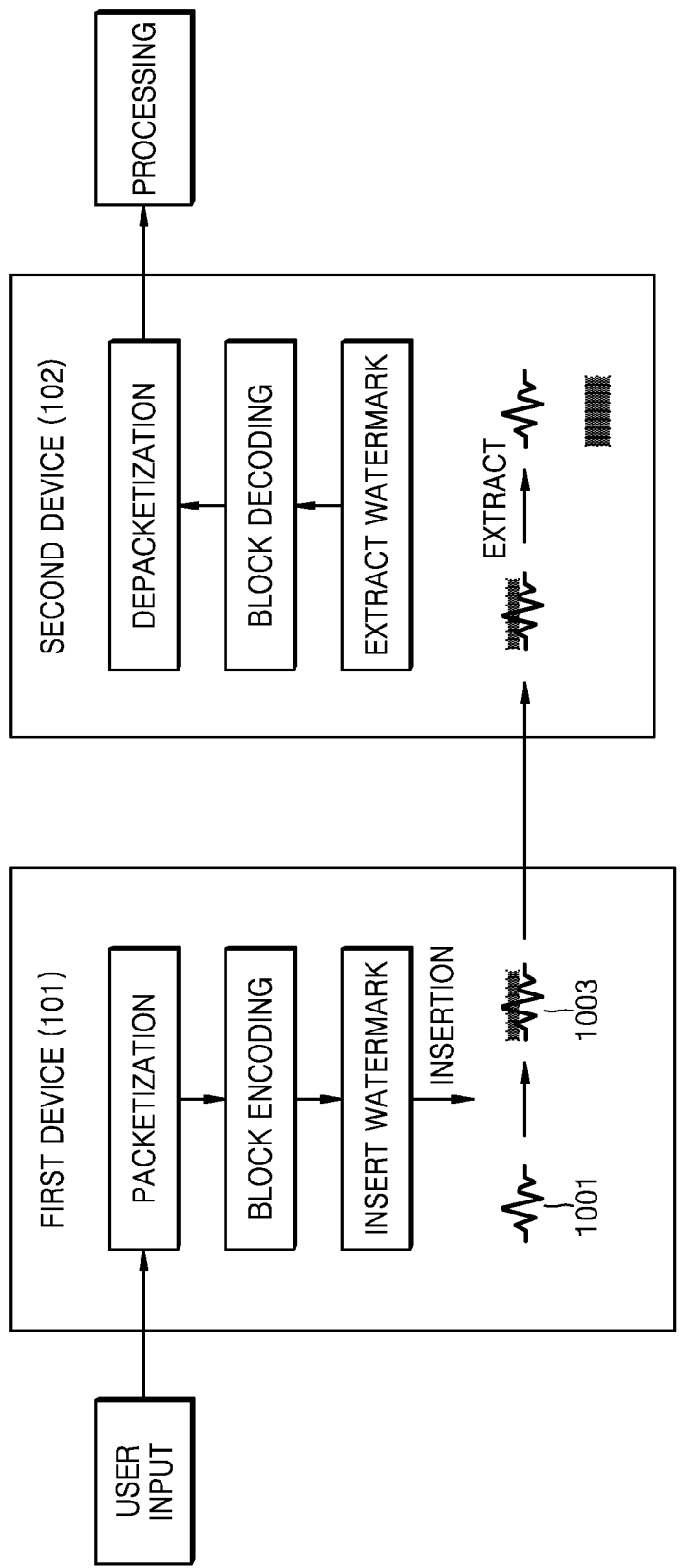
FIG. 10 is a diagram of a system of inserting a user input as watermark data according to an embodiment of the present disclosure.

FIG. 10 is a diagram of a system of inserting a user input as watermark data according to an embodiment of the present disclosure.

According to various embodiments of the present disclosure, the first device 101 may receive a user input. The first device 101 may generate watermark data based on the user input. According to one or more embodiments of the present disclosure, the first device 101 may generate control information or system setting information based on the user input, and may generate the watermark data based on generated control information or system setting information.

According to various embodiments of the present disclosure, the first device 101 packetizes the user input by using a packetization module, and inserts packetized user input in audio data 1001 as watermark data. In addition, according to one or more embodiments of the present disclosure, the first device 101 may generate packets generated based on the user input as a pulse code modulation (PCM) frame by using a sound block encoder module.

According to various embodiments of the present disclosure, the control information may include information for controlling a device to execute a predetermined operation, and the system setting information may include information for setting a system of a system. However, one or more embodiments are not limited thereto.

Referring to FIG. 10, according to various embodiments of the present disclosure, the first device 101 may insert generated watermark data in original audio data 1001. According to one or more embodiments of the present disclosure, the first device 1001 may insert the watermark data to an audible frequency region or an inaudible frequency region of the original audio data 1001.

According to various embodiments of the present disclosure, the first device 101 may transmit first audio data 1003, in which the watermark data is inserted, to a second device 102. In addition, the first device 101 may include an audio encoder that compressed the first audio data 1003 in which the watermark data is inserted in a predetermined compression manner, and encodes and transmits the first audio data 1003 to the second device 102.

According to various embodiments of the present disclosure, the first device 101 may transmit the first audio data 1003 to the second device 102 via various communication media and communication standards. For example, the first device 101 may transmit the first audio data 1003 to the second device 102 in a communication standard such as auxiliary port (AUX), Bluetooth, and Wi-Fi, via a wireless or wired communication medium.

According to various embodiments of the present disclosure, the second device 102 receives the first audio data 1003. The second device 102 may extract the watermark data from the first audio data 1003.

According to various embodiments of the present disclosure, the second device 102 may process the first audio data 1003 transmitted from the first device 101 in a PCM frame unit, and depacketizes the packets generated by the first device 101 based on the user input to obtain the user input. In addition, when the first device 101 transmits the first audio data 1003 after encoding the first audio data 1003, the second device 102 may decode the first audio data 1003.

According to various embodiments of the present disclosure, the second device 102 may perform a predetermined operation according to the user input included in the watermark data. For example, the second device 102 may control a predetermined element in the second device or change system settings of the second device 102 according to the control information or the system setting information included in the watermark data.

Figure 11:
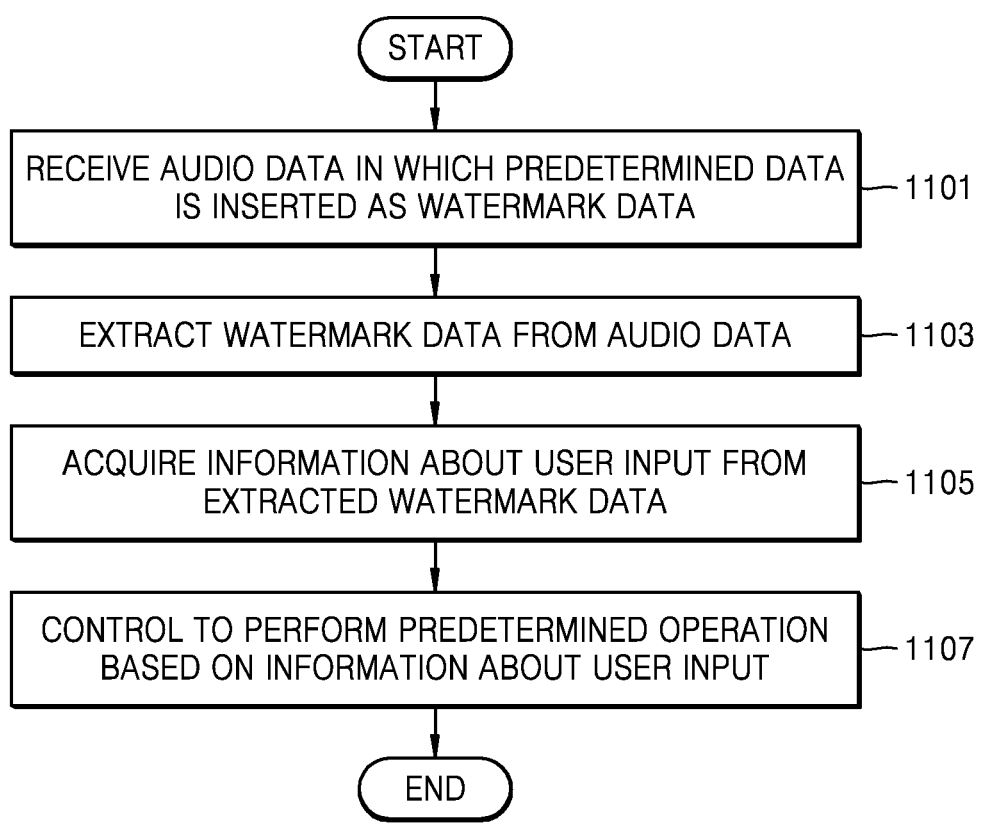
FIG. 11 is a flowchart of processes of extracting watermark data from data, in which a user input is inserted as watermark data according to an embodiment of the present disclosure.

FIG. 11 is a flowchart for describing processes of extracting watermark data from data in which a user input is inserted as the watermark data according to an embodiment of the present disclosure.

Referring to FIG. 11, in operation 1101, a device may receive audio data in which predetermined data is inserted as watermark data.

According to various embodiments of the present disclosure, the watermark data included in the audio data may be included as packets. A device for inserting the watermark receives a user input, generates the watermark data according to the user input, and packetizes the watermark data to be inserted in the audio data.

According to various embodiments of the present disclosure, the audio data transmitted to the device may be data compressed by using a predetermined codec. In addition, the device may receive the audio data via a predetermined communication medium as described above with reference to FIG. 10.

In operation 1103, the device may extract the watermark data from the audio data.

In operation 1105, the device may acquire information about the user input from extracted watermark data.

According to one or more embodiments of the present disclosure, the device extracts the watermark data, and parses the watermark data based on a packet or block structure if the watermark data is a packet or a block having a predetermined format to obtain information about the user input in the watermark data.

In operation 1107, the device may perform a predetermined operation based on the information about the user input. For example, when the user input includes control information, the device may control each element in the device based on the control information.

Figure 12:
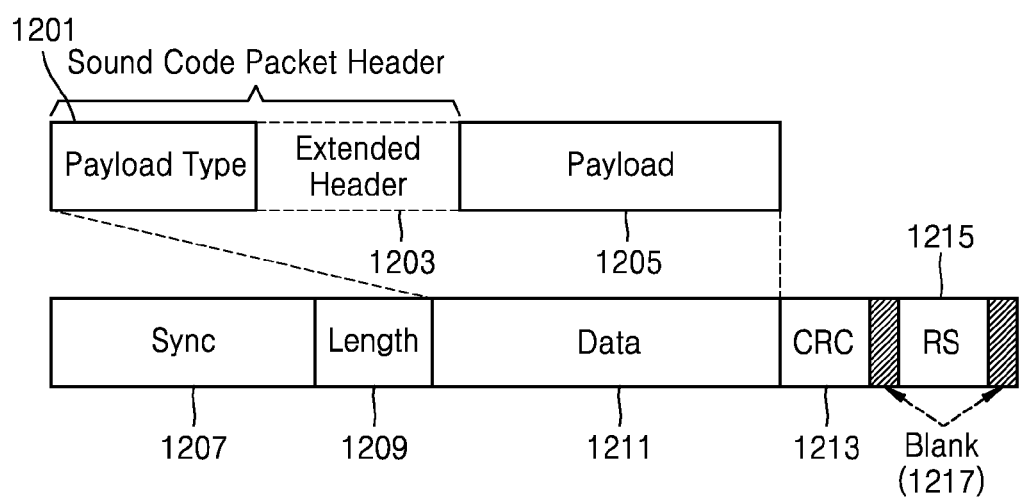
FIG. 12 is a diagram of a packet format of watermark data according to an embodiment of the present disclosure.

FIG. 12 is a diagram showing a packet format in watermark data according to an embodiment of the present disclosure.

Referring to FIG. 12, according to one or more embodiments of the present disclosure, the watermark data generated based on the user input may be packetized in a watermark data packet format. The watermark data packet may include a sync field 1207, a length field 1209, a CRC field 1213, an RS field 1215, and a data field 1211 including a payload type field 1201, an extended header field 1203, and a payload field 1205, and blanks 1217 may be disposed between fields.

According to various embodiments of the present disclosure, the payload type field 1201 may include information representing a type of data included in a payload. For example, the payload type field 1201 may include information identifying that the data included in the payload is data about the user input.

According to various embodiments of the present disclosure, the extended header field 1203 may be omitted in various embodiments of the present disclosure, and may further include information in addition to the information about the payload type. In addition, according to one or more embodiments of the present disclosure, the payload type field 1201 and the extended header field 1203 may be included in a sound code packet header.

According to various embodiments of the present disclosure, the payload field 1205 may include information about the user input. For example, the device receives the user input and inserts information about the user input to the payload field 1205, and then, may packetize the user input as the watermark data packet.

According to various embodiments of the present disclosure, the sync field 1207 may include information representing start of the watermark data. In addition, according to one or more embodiments of the present disclosure, the length field 1209 may include information representing a length of the data field 1211.

According to various embodiments of the present disclosure, the data field 1211 may include the payload type field 1201, the extended header field 1203, and the payload field 1205.

According to one or more embodiments of the present disclosure, the CRC field 1213 and the RS field 1215 may include fields for detecting and correcting errors. Also, according to one or more embodiments of the present disclosure, the blanks 1217 may denote sections that are empty in preparation for a case where the sync field 1207 is not exactly detected.

According to various embodiments of the present disclosure, the payload type field 1201, the extended header field 1203, and the payload field 1205 may configure one packet, and the data field 1211 of one block unit that includes the sync field 1207, the length field 1209, the CRC field 1213, the RS field 1215, and the data field 1211 may include a plurality of packets. That is, a format of the watermark data generated by the user input is not limited.

Figure 13:
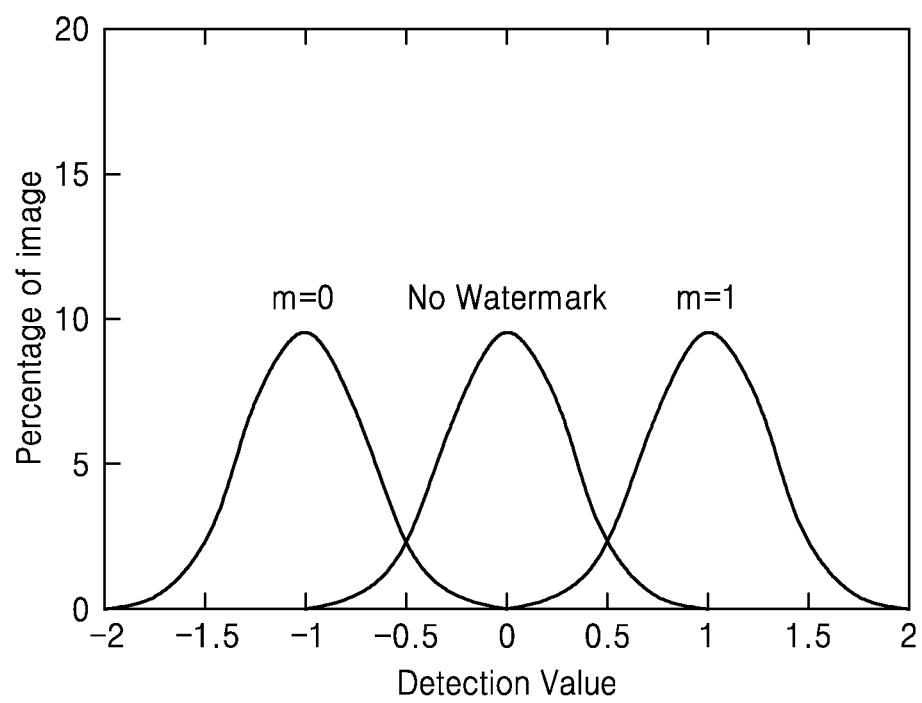
FIGS. 13 to 15 are diagrams showing accuracy of watermark data based on a method of inserting watermark data according to an embodiment of the present disclosure.
Figure 14:
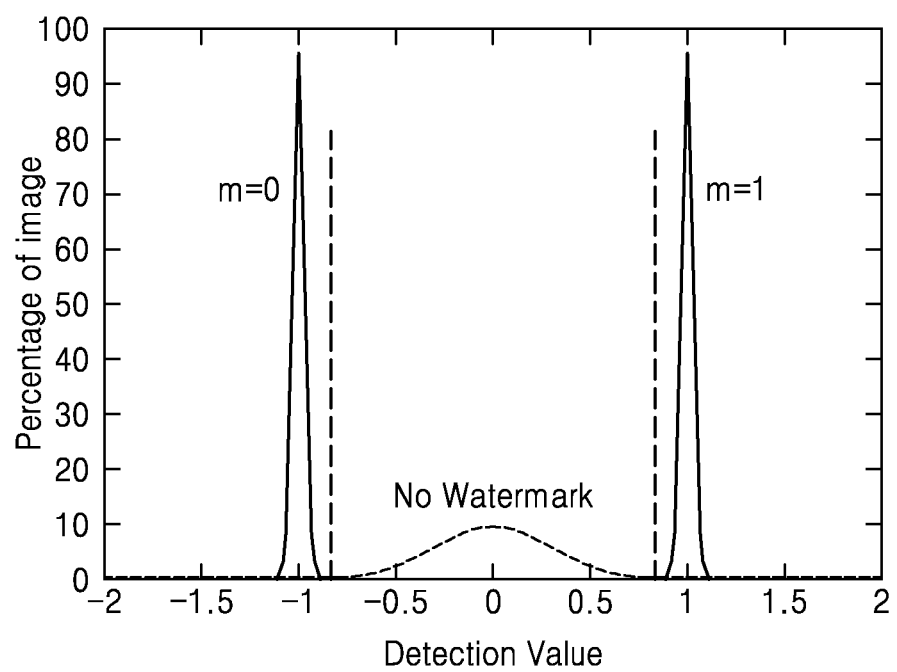
Figure 15:
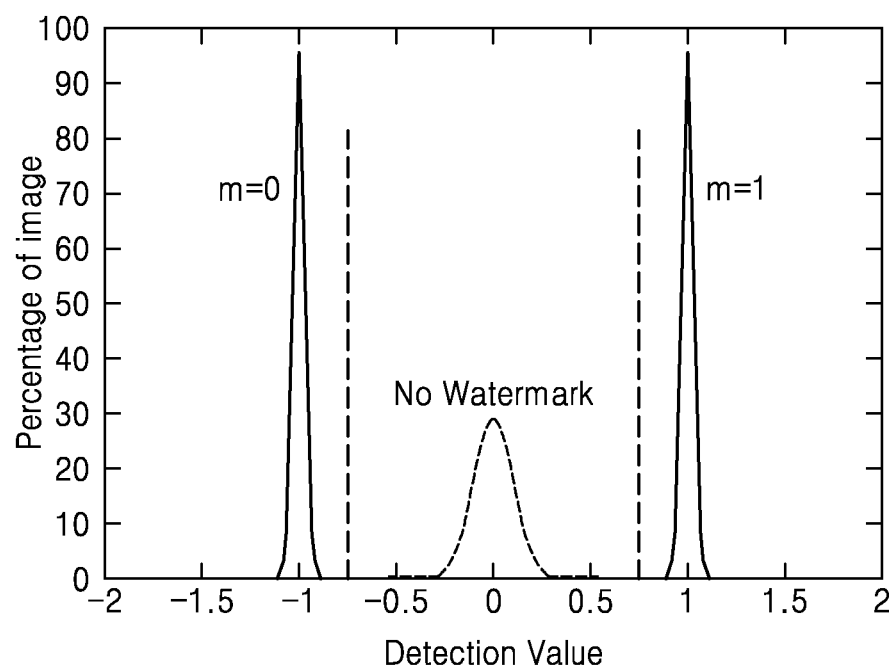

FIGS. 13, 14 and 15 are diagrams showing an accuracy of detecting watermark data based on a method of inserting the watermark according to an embodiment of the present disclosure.

According to one or more embodiments of the present disclosure, a watermark inserting device may transmit data in which the watermark data is inserted to a watermark detecting device. During transmitting the data, the data, in which the watermark data is inserted, transmitted from the watermark inserting device may be deformed due to fading or noise, and the watermark detecting device detects the watermark data based on deformed data. In order to detect the watermark data exactly from the data that has been deformed due to the noise or the fading, the watermark inserting device has to insert the watermark according to the watermark insertion method described above.

Referring to FIGS. 13, 14 and 15, a curve in which m=0 denotes that a watermark bit having a bit of 0 is detected from the data, and a curve in which m=1 denotes that watermark bit having a bit of 1 is detected from the data. A curve 'No watermark' may denote that the watermark data is not detected.

In addition, in FIGS. 13, 14 and 15, a transverse axis of a graph denotes a data detection value, and the watermark detecting device may determine whether the watermark data is inserted in the data based on a detection value of the data. According to one or more embodiments of the present disclosure, the detection value of the data may be one of a signal intensity value of the data, a peak value, and a pixel value of the data. A longitudinal axis of the graph may denote a ratio of the data.

FIG. 13 shows an accuracy of detecting watermark data at a receiving device, when a watermark inserting device inserts effective watermark data only in predetermined data without setting a certain location.

Referring to a graph of FIG. 13, a curve when m is 0 and a curve when there is no watermark overlap each other, and a curve when m is 1 and a curve when there is no watermark overlap each other. That is, a false alarm or miss detection occurs, that is, a watermark bit of 0 or 1 is detected from a portion in the data, in which the watermark data is not inserted. According to one or more embodiments of the present disclosure, when the miss detection occurs, the watermark detecting device may not extract the watermark data exactly, and thus, may not read predetermined data included in the watermark data.

FIG. 14 shows an accuracy of detecting watermark data at a receiving device, in a case when a watermark inserting device determines an insertion location of effective watermark data taking into account characteristics of data and inserts the effective watermark data. According to one or more embodiments of the present disclosure, taking into account of the characteristics of data may denote considering of characteristics that the user may not exactly recognize.

Referring to a graph of FIG. 14, dotted lines denote a critical detection value. A watermark detecting device determines whether the watermark data is detected based on critical detection values −0.8 and 0.8. As described above, the critical detection value may be determined by the watermark inserting device, the watermark detecting device, or the user input.

Unlike the graph of FIG. 13, according to the graph of FIG. 14, a curve when m is 0 and a curve when there is no watermark do not overlap each other, and a curve when m is 1 and the curve when there is no watermark do not overlap each other, either. That is, the miss detection may not occur.

However, referring to the graph of FIG. 14, the curve when there is no watermark and the curves when m is 0 and m is 1 are very adjacent to each other, and the curve when there is no watermark has a wide variation. That is, it is difficult for the watermark detecting device to determine an exact critical detection value. In addition, the watermark inserting device has to insert the watermark data with a predetermined signal intensity or greater in order to exactly detect the watermark data, and thus, original data may be largely deformed.

FIG. 15 shows an accuracy of detecting watermark data at a receiving device, in a case where a watermark inserting device determines insertion locations of effective watermark data and control watermark data and inserts the effective watermark data and the control watermark data.

Referring to a graph of FIG. 15, dotted lines denote critical detection values. A watermark detecting device determines whether the watermark data is detected based on the critical detection values −0.7 and 0.7. As described above, the critical detection values may be determined by watermark inserting device, the watermark detecting device, or the user input.

Unlike the graph of FIG. 13, in the graph of FIG. 15, a curve when m is 0 and a curve when there is no watermark do not overlap each other, and a curve when m is 1 and the curve when there is no watermark do not overlap each other. That is, a miss detection does not occur. Also, unlike the graph of FIG. 14, the curve when there is no watermark and the curves when m is 0 and when in is 1 are not adjacent to each other, and the curve when there is no watermark has a narrow variation. That is, the watermark detecting device is easy to detect exact critical detection value, comparing with the case of FIG. 14. Also, since the watermark inserting device inserts the control watermark data, the original data is adjusted so that a portion where the watermark is not detected and a portion where the watermark is detected may be exactly distinguished from each other. Therefore, there is no need to insert the watermark data with a predetermined signal intensity or greater, and the original data is not largely deformed.

Figure 16:
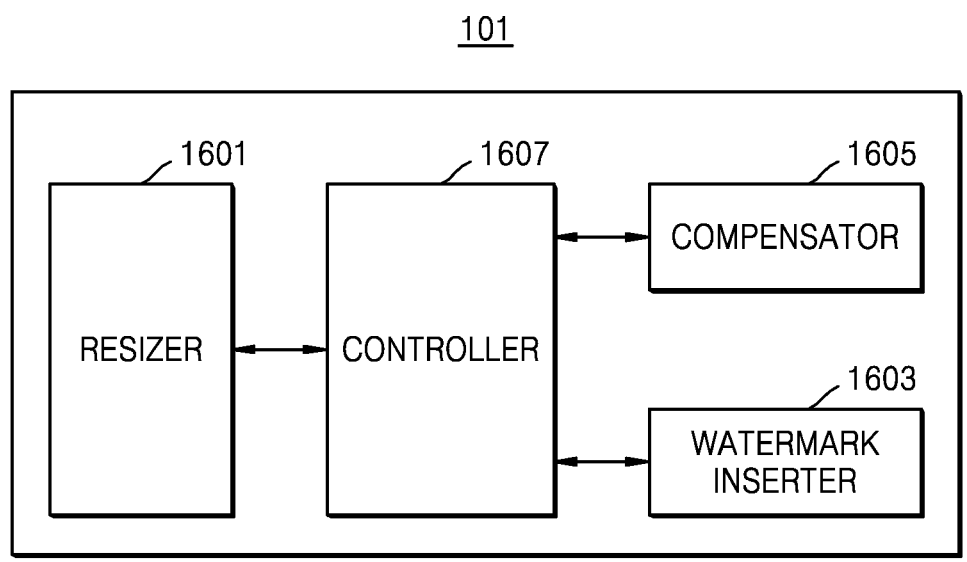
FIGS. 16 and 17 are block diagrams of a device for inserting watermark data according to an embodiment of the present disclosure.
Figure 17:
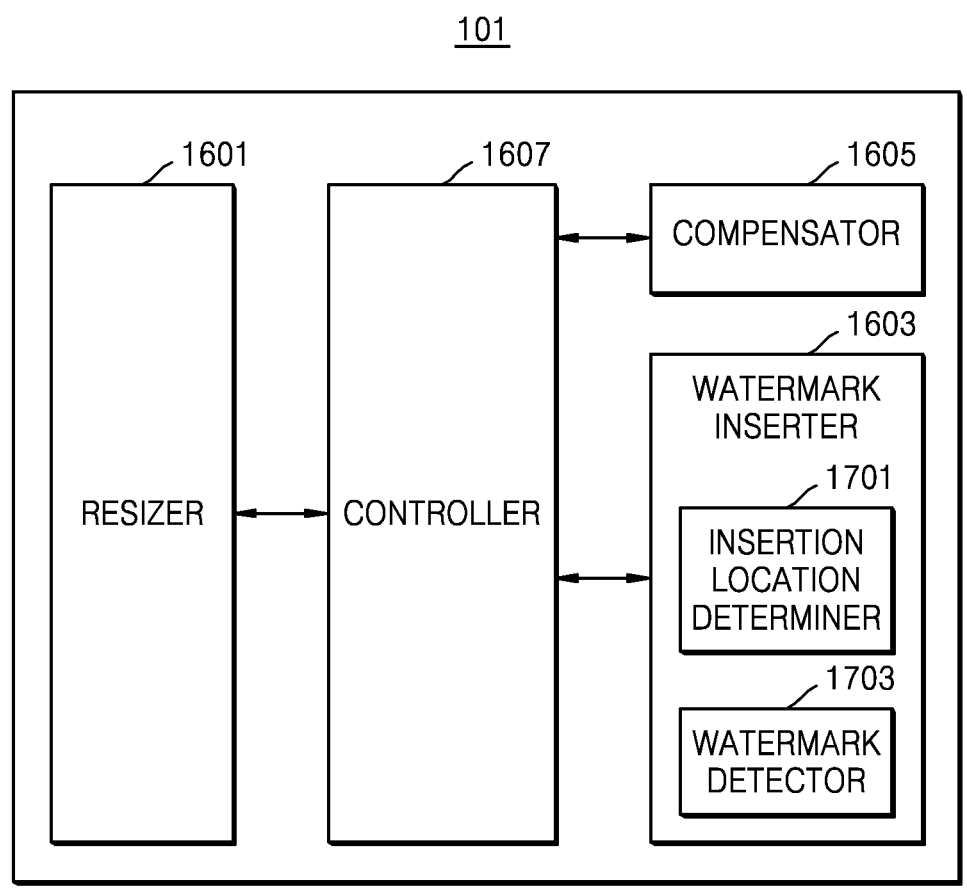

FIGS. 16 and 17 are block diagrams of a device that inserts watermark data according to an embodiment of the present disclosure.

Referring to FIG. 16, the first device 101, that is, the device that inserts the watermark data according to one or more embodiments of the present disclosure, may include a resizer 1601, a watermark inserter 1603, a compensator 1605, and a controller 1607. However, not all the elements shown in FIG. 16 are essential elements of the first device 101. That is, the first device 101 may include more elements or less elements than those of FIG. 16. Also, according to one or more embodiments of the present disclosure, the second device 102 that extracts the watermark data may have a configuration that is the same as that of the first device 101.

According to various embodiments of the present disclosure, the resizer 1601 may generate first image data by resizing original image data to a predetermined size. According to one or more embodiments of the present disclosure, the predetermined size may denote a predetermined resolution.

According to various embodiments of the present disclosure, the watermark inserter 1603 may insert watermark data in the first image data. The watermark data inserted by the watermark inserter 1603 may include effective watermark data and control watermark data.

According to various embodiments of the present disclosure, the watermark inserter 1603 may determine at least one of an insertion location of the effective watermark data and an insertion location of the control watermark data. In addition, the watermark inserter 1603 may analyse the first image data based on a pixel value of a predetermined pixel or predetermined pixel groups in the first image data and a critical detection value.

According to various embodiments of the present disclosure, the compensator 1605 may add difference data between the original image data and the first image data to second image data that is generated by inserting the watermark data in the first image data. In addition, according to one or more embodiments of the present disclosure, the compensator 1605 may resize the second image data to be the same as the original image data, and may add difference data between the original image data and the first image data to the resized second image data.

According to various embodiments of the present disclosure, the controller 1607 controls overall operations of the first device 101. For example, the controller 1607 may execute a program stored in the first device 101 to control elements included in the first device 101. In addition, the controller 1607 may include at least one processor.

Referring to FIG. 17, the watermark inserter 1603 may further include an insertion location determiner 1701 and a watermark detector 1703. However, not all the elements shown in FIG. 17 are essential elements of the first device 101. That is, the first device 101 may include more elements or less elements than those of FIG. 17.

According to various embodiments of the present disclosure, the insertion location determiner 1701 may determine at least one of the insertion location of the effective watermark data and the insertion location of the control watermark data. In addition, according to various embodiments of the present disclosure, the insertion location determiner 1701 may compare entire or some of first image frequency signals that have been converted based on a pixel value of a predetermined pixel or predetermined pixel groups in the first image data, with the critical detection value.

According to various embodiments of the present disclosure, the insertion location determiner 1701 may determine the first insertion location that is a location of a pixel or a pixel group, which is determined that entire or some of the effective watermark data is detected, and the second insertion location that is a location of a pixel or a pixel group that is determined to have a value that is greater or smaller the critical detection value by a predetermined value or greater.

In addition, the watermark inserter 1603 inserts the control watermark data to the first insertion location and the effective watermark data to the second insertion location. Also, the watermark inserter 1603 may convert the effective watermark data and the control watermark data to frequency signals, and then, insert the frequency signals to entire or some of the first image frequency signals that have been converted based on the pixel value of the predetermined pixel or predetermined pixel groups in the first image data.

According to one or more embodiments of the present disclosure, the watermark detector 1703 may analyse the first image data based on the pixel value of the predetermined pixel or predetermined pixel groups in the first image data and the critical detection values.

Also, according to one or more embodiments of the present disclosure, the effective watermark data may be generated based on a user input or information about the original image data.

Figure 18:
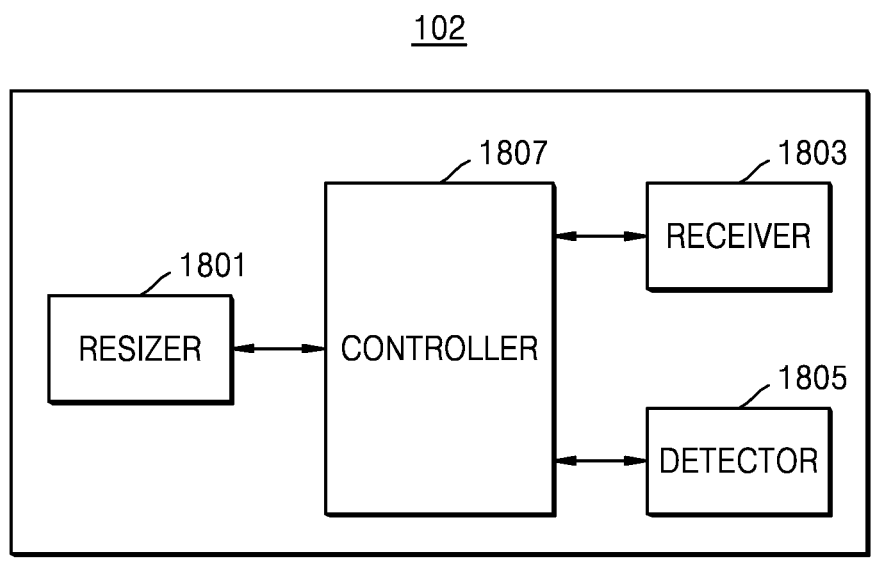
FIG. 18 is a block diagram of a device for extracting watermark data according to an embodiment of the present disclosure.

FIG. 18 is a block diagram of a device for extracting watermark data, according to an embodiment of the present disclosure.

Referring to FIG. 18, the second device 102 for inserting watermark data according to an embodiment may include a resizer 1801, a receiver 1803, a detector 1805, and a controller 1807. However, not all the elements shown in FIG. 18 are essential elements of the second device 102. That is, the second device 102 may include more elements or less elements than those of FIG. 18. Also, according to various embodiments of the present disclosure, the first device 101 that inserts the watermark data may have a configuration that is the same as that of the second device 102.

According to various embodiments of the present disclosure, the resizer 1801 may resize first data that is generated by inserting watermark data to original data to a predetermined size. As described above, the resizer 1801 may resize the original data to a predetermined size in order to extract the watermark data inserted in the original data.

According to various embodiments of the present disclosure, the receiver 1803 may receive the first data, in which predetermined data has been inserted as watermark data.

According to various embodiments of the present disclosure, the detector 1805 may extract the watermark data from the first data that has been resized to a predetermined size. The method of extracting the watermark data is described above, and thus, detailed descriptions thereof are omitted.

According to various embodiments of the present disclosure, the controller 1807 controls overall operations of the second device 102. For example, the controller 1807 executes a program stored in the second device 102 so as to control elements included in the second device 102. In addition, the controller 1807 may include at least one processor.

According to various embodiments of the present disclosure, the controller 1807 may control the second device 102 to classify data or to perform a predetermined operation based on the watermark data. The controller 1807 acquires a command for executing a predetermined operation from the watermark data, and performs the predetermined operation based on the command. For example, the controller 170 may parse the watermark data to obtain a predetermined command.

According to various embodiments of the present disclosure, the first data may be image data or audio data. In addition, the watermark data inserted in the first data may be image information or data generated based on a user input. According to various embodiments of the present disclosure, the image information may include information about the first data or information about original data of the first data. Also, the data generated based on the user input may include control information or system setting information based on the user input.

According to various embodiments of the present disclosure, the first data may be generated by a server. In addition, the watermark data inserted in the first data may be formed as a block or a packet format including at least one of a sync field representing start of the watermark data, a length field representing a length of the watermark data, a CRC field, an RS field, and a payload field for detecting and correcting errors. The watermark data packet or the watermark data block may be inserted in the first data.

Figure 19:
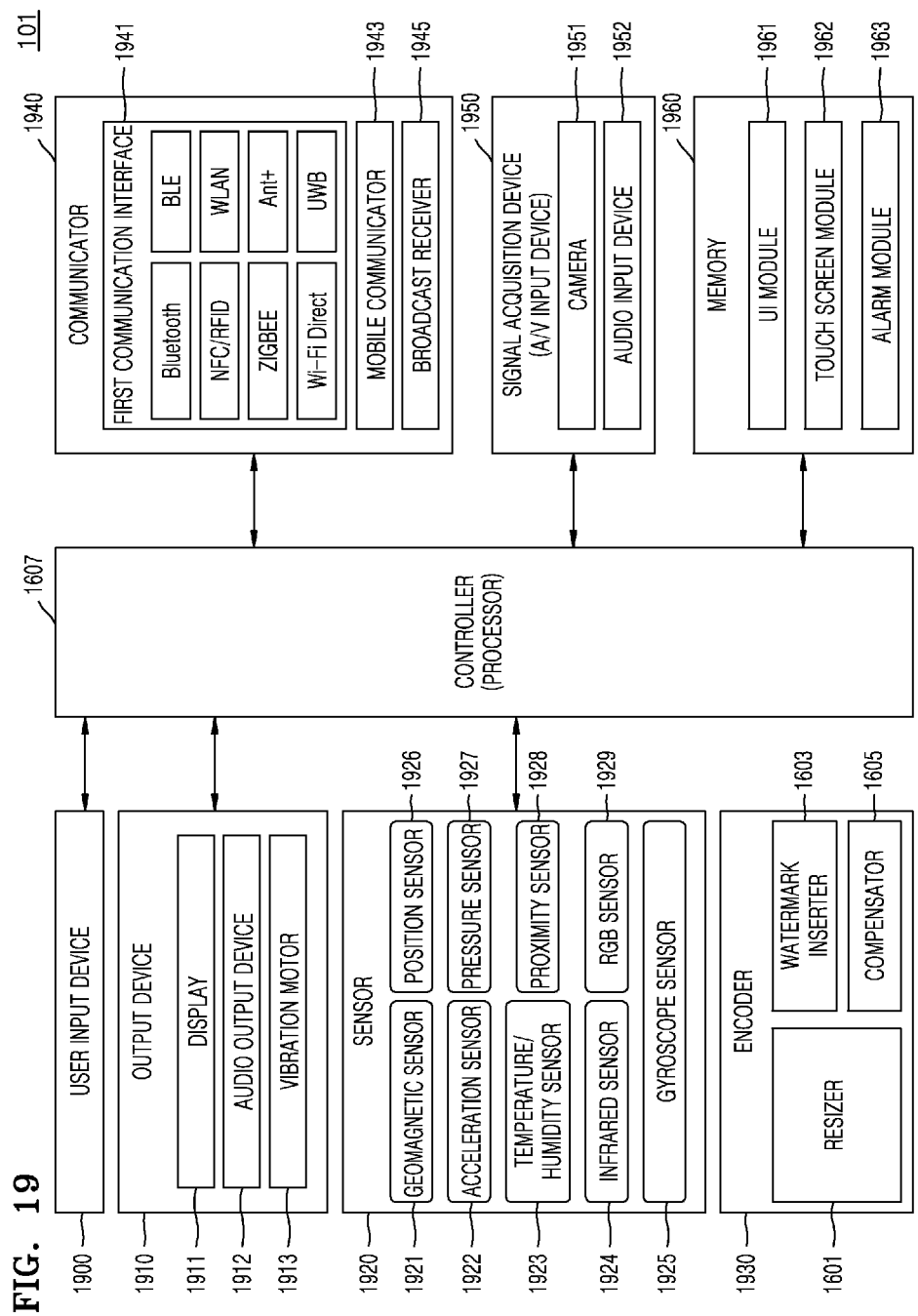
FIG. 19 is a more detailed block diagram of a device for inserting watermark data according to an embodiment of the present disclosure.

FIG. 19 is a block diagram of a device for inserting watermark data in more detail, according to an embodiment of the present disclosure.

Referring to FIG. 19, the first device 101 for inserting the watermark data according to an embodiment may include an encoder 1930 including the resizer 1601, the watermark inserter 1603, and the compensator 1605, the controller 1607, a user input device 1900, an output device 1910, a sensor 1920, a communicator 1940, an audio/video (A/V) input device 1950, and a storage (memory) 1960. However, not all the elements shown in FIG. 19 are essential elements of the first device 101. That is, the first device 101 may include more elements or less elements than those of FIG. 19. Also, according to one or more embodiments of the present disclosure, the second device 102 may have a configuration that is the same as that of the first device 101.

The encoder 1930 may include the resizer 1601, the watermark inserter 1603, and the compensator 1605, and the elements included in the encoder 1930 are described above and thus detailed descriptions thereof are omitted.

According to one or more embodiments of the present disclosure, the user input device 1900 is a unit through which data for controlling the first device 101 is input by the user. For example, the user input device 1900 may include a keypad, a dome switch, a touch pad (a touch capacitive-type touch pad, a pressure resistive-type touch pad, an infrared beam-sensing-type touch pad, a surface acoustic wave-type touch pad, an integral strain gauge type touch pad, a piezoelectric effect-type touch pad, or the like), a jog wheel, and a jog switch, but is not limited thereto.

The output device 1910 may output an audio signal, a video signal, or a vibration signal, and may include a display 1911, an audio output device 1912, and a vibration motor 1913.

The display 1911 may display information processed by the first device 101.

In addition, in a case where the display 1911 and a touch pad form a layered structure to correspond to a touch screen, the display 1911 may also be used as an input device as well as an output device. The display 1911 may include at least one from among a liquid crystal display (LCD), a thin-film transistor-LCD (TFT-LCD), an organic light-emitting diode (OLED), a flexible display, a three-dimensional (3D) display, and an electrophoretic display. In addition, according to implementations of the first device 101, the first device 101 may include two or more displays 1911. The two or more displays 1911 may be disposed facing each other by a hinge.

The audio output device 1912 outputs audio data which may be transmitted from the communicator 1940 or stored in the storage (memory) 1640. In addition, the audio output device 1912 outputs an audio signal related to functions performed at the first device 101 such as, for example, a call signal reception sound, a message reception sound, and an alarm sound. The audio output device 1912 may include a speaker, a buzzer, etc.

The vibration motor 1913 may output a vibration signal. For example, the vibration motor 1913 may output a vibration signal which corresponds to an output of audio data or video data such as, for example, a call signal reception sound, a message reception sound, etc. Additionally, the vibration motor 1913 may output a vibration signal, if a touch is input to a touch screen.

According to various embodiments of the present disclosure, the sensor 1920 may detect a status of the first device 101 or a status of a periphery of the first device 101, and transmit the sensing information to the controller 1405.

The sensor 1920 may include at least one selected from a geomagnetic sensor 1921, an acceleration sensor 1922, a temperature/humidity sensor 1923, an infrared sensor 1924, a gyroscope sensor 1925, a position sensor (for example, GPS) 1926, a pressure sensor 1927, a proximity sensor 1928, and an RGB sensor 1929, but is not limited thereto. Additionally, since the functions of the respective sensors may be intuitively inferred from their names, a detailed description thereof is omitted.

According to various embodiments of the present disclosure, the communicator 1940 may include a short-range communicator 1941, a mobile communicator 1943, and a broadcast receiver 1945. The short-range communicator 1941 may include a Bluetooth communication device, a Bluetooth low energy (BLE) communication device, a near field communication (NFC) device, a wireless local area network (WLAN) (WiFi) communication device, a Zigbee communication device, an infrared data association (IrDA) communication device, a Wi-Fi direction (WFD) communication device, an ultra-wideband (UWB) communication device, and an ANT+ communication device, but is not limited thereto.

In addition, each communicator included in the short-range communicator 1941 may include a transmitter and a receiver. The transmitter may transmit all data including the data in which the watermark data is inserted to the second device or the server, and the receiver may receive all data including the data in which the watermark data from the second device or the server.

According to various embodiments of the present disclosure, the mobile communicator 1943 transmits and receives a wireless signal to and from with at least one selected from a base station, an external terminal, and a server on a mobile communication network. The wireless signal may include a voice call signal, a video call signal, or various types of data according to text/multimedia message transmission/reception.

The broadcast receiver 1945 receives broadcasting signals and/or broadcasting-related information via a broadcasting channel. The broadcasting channel may include a satellite channel and a terrestrial broadcast channel. According to various embodiments of the present disclosure, the first device 101 may not include the broadcast receiver 1945.

The A/V input device 1950 functions to input audio or video signals, and may include a camera 1951 and an audio input device 1952. The camera 1951 may obtain an image frame such as a still picture or a moving picture through an image sensor, in a video phone mode or a photographing mode. An image captured through the image sensor may be processed through the controller 1607 or an additional image processing device (not illustrated).

The image frame processed in the camera 1951 may be stored in the storage (memory) 1960, or transmitted to outside through the communicator 1940. The A/V input device 1950 may include two or more cameras 1951 according to a configuration type of the terminal.

The audio input device 1952 receives external sound signals and processes the external sound signals into electrical voice data. For example, the audio input device 1952 may be a microphone, but is not limited thereto. The audio input device 1952 may receive audio signals from an external device, the server, or the user. The audio input device 1952 may use various noise removal algorithms for removing noise generated in the process of receiving external audio signals.

According to one or more embodiments of the present disclosure, the storage (memory) 1960 may store a program for processing and controlling the controller 1607, and may store data to be input to the first device 101 or output from the first device 101.

According to one or more embodiments of the present disclosure, the storage (memory) 1960 may include a storage medium of at least one type of a flash memory type, a hard disk type, a multimedia card type, a card type memory (for example, secure digital (SD) or extreme digital (XD) memory), a random access memory RAM), a static RAM (SRAM), a read-only memory (ROM), an electrically erasable programmable ROM (EEPROM), a programmable read-only memory (PROM), a magnetic memory, a magnetic disk, and an optical disk.

According to various embodiments of the present disclosure, the programs, stored in the storage (memory) 1960, may be classified into a plurality of modules according to functions. For example, the programs may be classified into a user interface (UI) module 1961, a touch screen module 1962, and an alarm module 1963.

The UI module 1961 may provide a specialized UI or graphical UI (GUI) which interworks with the first device 101. For example, the UI module 1961 may provide a watermark data insertion button, a UI or GUI for changing a size of image data or audio data.

The touch screen module 1962 may detect a touch gesture on a touch screen by a user and transmit information on the touch gesture to the controller 1607. According to various embodiments of the present disclosure, the touch screen module 1962 may recognize and analyze touch codes. The touch screen module 1962 may be implemented with separate hardware including a controller.

Various types of sensors may be disposed inside or near the touch screen, in order to detect a touch or a proximity touch on the touch screen. An example of a sensor for detecting a touch on the touch screen may be a tactile sensor. The tactile sensor is a sensor for detecting a contact of a specific object to such a degree that humans may feel the contact with the specific object or to a higher degree. The tactile sensor may detect various types of information such as information about a roughness of a contact surface, a hardness of a contact object, a temperature at a contact point, etc.

Additionally, an example of a sensor for detecting a touch on the touch screen is a proximity sensor.

The proximity sensor refers to a sensor that detects the presence or absence of an object approaching a predetermined detection surface or an object existing near the sensor by an electromagnetic force or infrared light, without mechanical contact. Examples of the proximity sensor includes a transmission-type photoelectric sensor, a direct reflection-type photoelectric sensor, a mirror reflection-type photoelectric sensor, a radio frequency oscillation-type proximity sensor, an electrostatic capacitance type proximity sensor, a magnetic-type proximity sensor, an infrared proximity sensor. Touch gestures of a user may include a tap, a touch and hold, a double-tap, a drag, panning, a flick, a drag-and-drop, a swipe, etc.

The alarm module 1963 outputs a signal for notifying an event occurrence of the first device 101. Examples of events occurring in the first device 101 include a call signal reception, a message reception, a key signal input, and a schedule notification. The alarm module 1963 may output an alarm signal in a form of a video signal via the display 1911 or in a form of an audio signal via the audio output device 1912. The alarm module 1963 may also output an alarm signal in a form of a vibration signal via the vibration motor 1913.

The apparatus according to one or more embodiments may include a processor, a memory storing and executing program data, a permanent storage such as a disk drive, a communication port communicating with an external device, and a user interface device such as a touch panel, a key, and a button. Methods implemented as software modules or algorithms may be stored as non-transitory computer readable codes on a computer readable recording medium. The non-transitory computer readable code can be recorded/transferred on a medium in a variety of ways, with examples of the medium including recording media, such as magnetic storage media (e.g., ROM, floppy disks, hard disks, etc.) and optical recording media (e.g., compact disc ROMs (CD-ROMs), or digital versatile discs (DVDs)). The media may also be a distributed network, so that the non-transitory computer readable code is stored/transferred and executed in a distributed fashion. Furthermore, the processing element could include a processor or a computer processor, and processing elements may be distributed and/or included in a single device.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments of the present disclosure. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments of the present disclosure, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of inserting a watermark, the method comprising:
    generating first image data by resizing original image data to a predetermined size;
    inserting watermark data in the first image data to generate second image data; and
    adding difference data corresponding to a difference between the original image data and the first image data to the second image data that is image data in which the watermark data is inserted,
    wherein the watermark data comprises effective watermark data and control watermark data, and
    wherein the inserting of the watermark data comprises:
        determining at least one of an insertion location of the effective watermark data and an insertion location of the control watermark data, and
        inserting the effective watermark data and the control watermark data in the first image data based on a result of the determining.

2. The method of claim 1, wherein the determining of the insertion location comprises:
    analyzing the first image data based on a pixel value of a predetermined pixel or predetermined pixel groups in the first image data and critical detection values; and
    determining the insertion location of the effective watermark data and the insertion location of the control watermark data in the first image data, based on a result of the analyzing.

3. The method of claim 2, wherein the analyzing of the first image data comprises comparing all or some of first image frequency signals that are converted based on the pixel value of the predetermined pixel or the predetermined pixel groups in the first image data, with the critical detection values.

4. The method of claim 3, wherein the determining of the insertion location of the effective watermark data and the insertion location of the control watermark data comprises:
    determining a first insertion location that is a location of a pixel or a pixel group that is determined to detect all or some of the watermark data; and
    determining a second insertion location that is a location of a pixel or a pixel group that is determined to have a value that is greater or smaller than the critical detection values by a predetermined value or greater, based on a result of the comparing.

5. The method of claim 4, wherein the inserting of the watermark data comprises:
    inserting the control watermark data into the first insertion location, and
    inserting the effective watermark data into the second insertion location.

6. The method of claim 3, wherein the inserting of the watermark data comprises:
    converting the effective watermark data and the control watermark data into frequency signals; and
    inserting the frequency signals into all or some of the first image frequency signals that are converted based on the pixel value of the predetermined pixel or the predetermined pixel groups in the first image data.

7. The method of claim 1, wherein the adding of the difference data comprises:
    resizing the second image data to a same size as the original image data; and
    adding the difference data corresponding to the difference between the original image data and the first image data to the resized second image data.

8. A device for inserting a watermark, the device comprising:
    a resizer configured to generate first image data by resizing original image data to a predetermined size;
    a watermark inserter configured to insert watermark data into the first image data to generate second image data; and
    a compensator configured to add difference data corresponding to a difference between the original image data and the first image data to the second image data that is image data in which the watermark data is inserted,
    wherein the watermark data comprises effective watermark data and control watermark data, and
    wherein the watermark inserter comprises an insertion location determiner configured to determine at least one of an insertion location of the effective watermark data and an insertion location of the control watermark data; and
    wherein the watermark inserter is further configured to insert the effective watermark data and the control watermark data into the first image data based on a result of the determining.

9. The device of claim 8,
    wherein the watermark inserter further comprises a watermark detector configured to analyze the first image data based on a pixel value of a predetermined pixel or predetermined pixel groups in the first image data and a critical detection value, and
    wherein the insertion location determiner is further configured to determine the insertion location of the effective watermark data and the insertion location of the control watermark data in the first image data based on a result of the analyzing.

10. The device of claim 9, wherein the watermark detector is further configured to compare all or some of first image frequency signals that have been converted to frequency signals based on the pixel value of the predetermined pixel or the predetermined pixel groups in the first image data, with the critical detection value.

11. The device of claim 10, wherein the insertion location determiner is further configured to determine a first insertion location that is a location of a pixel or a pixel group that is determined to detect all or some of the watermark data and a second insertion location that is a location of a pixel or a pixel group that is determined to have a value that is greater or smaller than the critical detection value by a predetermined value or greater, based on a result of the comparing.

12. The device of claim 11, wherein the watermark inserter is further configured to insert the control watermark data into the first insertion location and insert the effective watermark data into the second insertion location.

13. The device of claim 10, wherein the watermark inserter is further configured to:
   convert the effective watermark data and the control watermark data into frequency signals; and
   insert the frequency signals into all or some of the first image frequency signals that are converted based on the pixel value of the predetermined pixel or the predetermined pixel groups in the first image data.

14. The device of claim 8, wherein the compensator is further configured to:
   resize the second image data to be same as a size of the original image data; and
   add the difference data corresponding to the difference between the original image data and the first image data to the resized second image data.

15. A non-transitory computer-readable recording medium having recorded thereon a program for executing the method of claim 1.

* * * * *